United States Patent [19]
Christie et al.

[11] Patent Number: 6,002,689
[45] Date of Patent: Dec. 14, 1999

[54] SYSTEM AND METHOD FOR INTERFACING A LOCAL COMMUNICATION DEVICE

[75] Inventors: Joseph Michael Christie, deceased, late of San Bruno, Calif.; by Joseph S. Christie, executor; by Jean M. Christie, executor, both of Mt. Pleasant, Pa.; Michael Joseph Gardner, Overland Park, Kans.; William Lyle Wiley, Olathe, Kans.; Albert Daniel Duree, Independence, Mo.; Tracy Lee Nelson, Shawnee Mission, Kans.

[73] Assignee: Sprint Communications Co. L.P.

[21] Appl. No.: 08/754,354

[22] Filed: Nov. 22, 1996

[51] Int. Cl.[6] .................................................... H04L 12/56
[52] U.S. Cl. .......................... 370/401; 370/410; 370/467
[58] Field of Search ...................................... 370/395, 396, 370/398, 400, 401, 402, 403, 404, 405, 410, 426, 465, 466, 467, 522, 524; 379/207, 219, 230, 234

[56] References Cited

U.S. PATENT DOCUMENTS

| | | |
|---|---|---|
| 4,201,889 | 5/1980 | Lawrence et al. . |
| 4,310,727 | 1/1982 | Lawser . |
| 4,348,554 | 9/1982 | Asmuth . |

(List continued on next page.)

FOREIGN PATENT DOCUMENTS

| | | |
|---|---|---|
| B2385392 | 3/1993 | Australia . |
| 0403414A2 | 12/1990 | European Pat. Off. . |
| 0426911A1 | 5/1991 | European Pat. Off. . |
| 90312739 | 7/1991 | European Pat. Off. . |
| 91303312 | 10/1991 | European Pat. Off. . |
| 0460843A2 | 12/1991 | European Pat. Off. . |
| 0466078A2 | 1/1992 | European Pat. Off. . |
| 91311342 | 7/1992 | European Pat. Off. . |
| 0539016A2 | 4/1993 | European Pat. Off. . |
| 0549016A1 | 6/1993 | European Pat. Off. . |
| 92307752 | 9/1993 | European Pat. Off. . |
| 0582418A2 | 2/1994 | European Pat. Off. . |
| 0592152A2 | 4/1994 | European Pat. Off. . |
| 592153A2 | 4/1994 | European Pat. Off. . |
| 592154A2 | 4/1994 | European Pat. Off. . |
| 0793393A2 | 9/1997 | European Pat. Off. . |
| 0863679A2 | 9/1998 | European Pat. Off. . |
| 4225203A1 | 12/1992 | Germany . |
| 870284896 | 5/1989 | Japan . |
| 07050057 | 9/1996 | Japan . |
| WO9318598 | 9/1993 | WIPO . |
| WO94/06251 | 3/1994 | WIPO . |
| WO95/04436 | 2/1995 | WIPO . |

OTHER PUBLICATIONS

Yoshikai, N., et al., "Report of the Meeting of SWP 13/1–4 (Draft Recommendation I.580)," ITU–T Telecommunication Standardization Sector, Study Group 13, pp. 1–51, (Mar. 7–18, 1994).

N/A, "Final Draft Text for Broadband Capability Set 2 Signaling Requirements, Attachment "D" Special Drafting Meeting," ITU–T Telecommunications Standardization Sector, Study Group 11, pp.1–127, (Sep. 13–22, 1993).

*Primary Examiner*—Chi H. Pham
*Assistant Examiner*—Kwang B. Yao
*Attorney, Agent, or Firm*—Harley R. Ball

[57] ABSTRACT

A system to interworking a call between a plurality of networks having different formats. The system has a GR-303 system, an integrated services digital network system, a service platform, and an asynchronous transfer mode system. The system has a signaling processor that is adapted to receive the call signaling and to process the call signaling to select a connection to one of the GR-303 system, the integrated services digital network system, the service platform, or the asynchronous transfer mode system. The signaling processor thereby selects the corresponding system on the connection. The signaling processor transports a control message identifying the selected connection. An interworking unit receives the user communications and the control message. The interworking unit converts the user communications from the format in which it was received to the format that is compatible with the selected system. The user communications are then transported on the selected connection.

84 Claims, 10 Drawing Sheets

U.S. PATENT DOCUMENTS

| | | |
|---|---|---|
| 4,453,247 | 6/1984 | Suzuki et al. . |
| 4,554,659 | 11/1985 | Blood et al. . |
| 4,565,903 | 1/1986 | Riley . |
| 4,683,563 | 7/1987 | Rouse et al. . |
| 4,730,312 | 3/1988 | Johnson . |
| 4,736,364 | 4/1988 | Basso et al. . |
| 4,748,658 | 5/1988 | Gopal . |
| 4,823,338 | 4/1989 | Chan et al. . |
| 4,853,955 | 8/1989 | Thorn et al. . |
| 4,896,319 | 1/1990 | Lidinsky et al. . |
| 4,916,690 | 4/1990 | Barri . |
| 4,926,416 | 5/1990 | Weik . |
| 4,979,118 | 12/1990 | Kheradpir . |
| 4,985,889 | 1/1991 | Frankish et al. . |
| 4,991,204 | 2/1991 | Yamamoto et al. . |
| 4,993,104 | 2/1991 | Gordon . |
| 5,003,584 | 3/1991 | Benyacar . |
| 5,018,191 | 5/1991 | Catron et al. . |
| 5,036,318 | 7/1991 | Bachhuber et al. . |
| 5,048,081 | 9/1991 | Gavaras . |
| 5,058,104 | 10/1991 | Yonehara et al. . |
| 5,067,123 | 11/1991 | Hyodo et al. . |
| 5,073,890 | 12/1991 | Danielsen . |
| 5,084,867 | 1/1992 | Tachibana et al. . |
| 5,086,461 | 2/1992 | Thorn et al. . |
| 5,089,954 | 2/1992 | Rago . |
| 5,091,903 | 2/1992 | Schrodi . |
| 5,101,404 | 3/1992 | Kunimoto et al. . |
| 5,115,431 | 5/1992 | Williams et al. . |
| 5,163,057 | 11/1992 | Grupp . |
| 5,168,492 | 12/1992 | Beshai et al. . |
| 5,185,743 | 2/1993 | Murayama . |
| 5,193,110 | 3/1993 | Jones et al. . |
| 5,204,857 | 4/1993 | Obara . |
| 5,216,669 | 6/1993 | Hofstetter et al. . |
| 5,218,602 | 6/1993 | Grant et al. . |
| 5,231,631 | 7/1993 | Buhrke et al. . |
| 5,231,633 | 7/1993 | Hluchyj et al. . |
| 5,233,607 | 8/1993 | Barwig et al. . |
| 5,239,539 | 8/1993 | Uchida et al. . |
| 5,239,542 | 8/1993 | Breidenstein et al. . |
| 5,249,178 | 9/1993 | Kurano et al. . |
| 5,251,255 | 10/1993 | Epley . |
| 5,253,247 | 10/1993 | Hirose et al. . |
| 5,255,266 | 10/1993 | Watanabe et al. . |
| 5,258,752 | 11/1993 | Fukaya et al. . |
| 5,258,979 | 11/1993 | Oomuro et al. . |
| 5,268,895 | 12/1993 | Topper . |
| 5,271,010 | 12/1993 | Miyake . |
| 5,274,680 | 12/1993 | Sorton et al. . |
| 5,278,889 | 1/1994 | Papanicolaou et al. . |
| 5,282,244 | 1/1994 | Fuller et al. . |
| 5,285,441 | 2/1994 | Bansal et al. . |
| 5,289,472 | 2/1994 | Cho . |
| 5,291,479 | 3/1994 | Vaziri et al. . |
| 5,291,492 | 3/1994 | Andrews et al. . |
| 5,311,509 | 5/1994 | Heddes et al. . |
| 5,317,562 | 5/1994 | Nardin et al. . |
| 5,323,389 | 6/1994 | Bitz et al. . |
| 5,327,421 | 7/1994 | Hiller et al. . |
| 5,327,433 | 7/1994 | Hall . |
| 5,329,308 | 7/1994 | Binns et al. . |
| 5,339,318 | 8/1994 | Tanaka . |
| 5,345,443 | 9/1994 | D'Ambrogio et al. . |
| 5,345,445 | 9/1994 | Hiller et al. ............................ 370/358 |
| 5,345,446 | 9/1994 | Hiller . |
| 5,357,510 | 10/1994 | Norizuki et al. . |
| 5,363,433 | 11/1994 | Isono . |
| 5,365,524 | 11/1994 | Hiller et al. . |
| 5,367,566 | 11/1994 | Moe et al. . |
| 5,373,504 | 12/1994 | Tanaka et al. . |
| 5,375,124 | 12/1994 | D'Ambrogio . |
| 5,377,186 | 12/1994 | Wegner . |
| 5,384,771 | 1/1995 | Isidoro et al. . |
| 5,384,840 | 1/1995 | Blatchford et al. . |
| 5,392,402 | 2/1995 | Robrock . |
| 5,394,393 | 2/1995 | Brisson et al. . |
| 5,394,398 | 2/1995 | Rau . |
| 5,400,339 | 3/1995 | Sekine et al. . |
| 5,414,701 | 5/1995 | Shtayer et al. . |
| 5,418,783 | 5/1995 | Yamaki et al. . |
| 5,420,857 | 5/1995 | Jurkevich . |
| 5,420,858 | 5/1995 | Marshall et al. . |
| 5,420,916 | 5/1995 | Sekiguchi . |
| 5,422,882 | 6/1995 | Hiller . |
| 5,425,090 | 6/1995 | Orriss . |
| 5,426,636 | 6/1995 | Hiller et al. . |
| 5,428,607 | 6/1995 | Hiller et al. . |
| 5,428,609 | 6/1995 | Eng et al. . |
| 5,434,852 | 7/1995 | LaPorta . |
| 5,434,981 | 7/1995 | Lenihan et al. . |
| 5,440,563 | 8/1995 | Isidoro et al. . |
| 5,444,713 | 8/1995 | Backaus et al. . |
| 5,446,738 | 8/1995 | Kim et al. . |
| 5,452,297 | 9/1995 | Hiller et al. . |
| 5,453,981 | 9/1995 | Katsube et al. . |
| 5,454,034 | 9/1995 | Martin . |
| 5,457,684 | 10/1995 | Bharucha . |
| 5,463,620 | 10/1995 | Sriram . |
| 5,463,621 | 10/1995 | Suzuki . |
| 5,473,677 | 12/1995 | D'Amato . |
| 5,473,679 | 12/1995 | La Porta et al. ........................ 379/201 |
| 5,477,537 | 12/1995 | Dankert et al. . |
| 5,479,401 | 12/1995 | Bitz et al. . |
| 5,479,402 | 12/1995 | Hata et al. . |
| 5,479,495 | 12/1995 | Blumhardt . |
| 5,483,527 | 1/1996 | Doshi et al. . |
| 5,485,455 | 1/1996 | Dobbins et al. . |
| 5,490,251 | 2/1996 | Clark et al. . |
| 5,495,484 | 2/1996 | Self et al. . |
| 5,499,290 | 3/1996 | Koster . |
| 5,504,742 | 4/1996 | Kakuma et al. . |
| 5,506,844 | 4/1996 | Rao . |
| 5,509,010 | 4/1996 | LaPorta . |
| 5,509,123 | 4/1996 | Dobbins et al. . |
| 5,513,178 | 4/1996 | Tanaka . |
| 5,519,707 | 5/1996 | Subramanian et al. . |
| 5,521,910 | 5/1996 | Matthews . |
| 5,522,042 | 5/1996 | Fee et al. . |
| 5,526,414 | 6/1996 | Bedard et al. . |
| 5,533,106 | 7/1996 | Blumhardt . |
| 5,539,698 | 7/1996 | Kozaki et al. . |
| 5,539,815 | 7/1996 | Samba . |
| 5,539,816 | 7/1996 | Pinard et al. . |
| 5,539,884 | 7/1996 | Robrock . |
| 5,541,918 | 7/1996 | Ganmukhi et al. . |
| 5,541,926 | 7/1996 | Saito et al. . |
| 5,544,152 | 8/1996 | Obermanns et al. . |
| 5,544,161 | 8/1996 | Bigham et al. . |
| 5,548,580 | 8/1996 | Buckland . |
| 5,550,819 | 8/1996 | Duault . |
| 5,550,914 | 8/1996 | Clarke et al. . |
| 5,563,939 | 10/1996 | La Porta et al. . |
| 5,566,173 | 10/1996 | Steinbrecher ........................... 370/466 |
| 5,568,475 | 10/1996 | Doshi et al. ........................... 370/399 |
| 5,570,368 | 10/1996 | Murakami et al. . |
| 5,577,039 | 11/1996 | Won et al. . |
| 5,579,311 | 11/1996 | Chopping et al. . |
| 5,586,177 | 12/1996 | Farris et al. . |
| 5,587,999 | 12/1996 | Endo . |
| 5,592,477 | 1/1997 | Farris et al. ........................... 370/396 |
| 5,600,640 | 2/1997 | Blair et al. . |

| | | |
|---|---|---|
| 5,600,643 | 2/1997 | Robrock . |
| 5,621,728 | 4/1997 | Lightfoot et al. . |
| 5,623,491 | 4/1997 | Skoog . |
| 5,627,836 | 5/1997 | Conoscenti et al. . |
| 5,629,930 | 5/1997 | Beshai et al. . |
| 5,635,980 | 6/1997 | Lin et al. . |
| 5,636,210 | 6/1997 | Agrawal et al. . |
| 5,636,261 | 6/1997 | Fils . |
| 5,640,446 | 6/1997 | Everett et al. ............................ 379/115 |
| 5,661,725 | 8/1997 | Buck . |
| 5,666,349 | 9/1997 | Petri . |
| 5,673,262 | 9/1997 | Shimizu . |
| 5,680,390 | 10/1997 | Rorock . |
| 5,684,792 | 11/1997 | Ishihara . |
| 5,703,876 | 12/1997 | Christie . |
| 5,708,702 | 1/1998 | DePaul et al. . |
| 5,710,769 | 1/1998 | Anderson et al. . |
| 5,719,863 | 2/1998 | Hummel . |
| 5,751,706 | 5/1998 | Land . |
| 5,796,813 | 8/1998 | Sonnenberg . |
| 5,818,919 | 10/1998 | Berberich, Jr. et al. . |
| 5,825,780 | 10/1998 | Christie . |
| 5,832,383 | 11/1998 | Yahagi . |
| 5,845,211 | 12/1998 | Roach, Jr. . |
| 5,848,128 | 12/1998 | Frey . |
| 5,854,836 | 12/1998 | Nimmagadda . |
| 5,867,570 | 2/1999 | Bargout et al. . |
| 5,867,571 | 2/1999 | Borchering . |

OTHER PUBLICATIONS

Ohta, S., et al., "A Dynamically Controllable ATM Transport Network Based on the Virtual Path Concept," Communications for the Information Age, Globecom'88, Conference Record, pp. 1272–1276, (Nov. 28–Dec. 1, 1988).

Fukazawa, M., et al., "Intelligent Network Call Model for Broadband ISDN," Fujitsu Laboratories, Ltd. (Japan), pp. 30.6.1–30.6.5.

Minzer, Steven, "A Signaling Protocol for Complex Multimedia Services," IEEE Journal on Selected Areas in Communications (ISSN 0733–8716), vol. 9 (No. 9), pp. 1383–1394, (Dec. 1991).

Faynberg, I., et al., "The Support of Network Interworking and Distributed Context Switching in the IN Service Data Function Model," 2nd Colloque International, ICIN 92, pp. 11–16, (Mar. 1992).

Woodworth, Clark B., et al., "A Flexible Broadband Packet Switch for a Multimedia Integrated Network," International Conference on Communications, Denver, ICC–91, pp. 3.2.1–3.2.8, (June 1991).

Miller, P., "Intelligent Network/2: A flexible framework for exchange services," Bell Communications Research Exchange, vol. 3 (No. 3), (May/June 1987).

Cooper, C., et al., "Toward a Broadband Congestion Control Strategy," IEEE Network, The Magazine of Computer Communications, (May 1990).

Batten, A., "Personal Communications Services and the Intelligent Network," British Telecommunications Engineering, (Aug. 1990).

Fujioka, M., et al., "Universal Service Creation and Provision Environment for Intelligent Network," IEEE Communications Magazine, (Jan. 1991).

Andrews, F., "Switching in a Competitive Market," IEEE Communications Magazine, (Jan. 1991).

N/A "Network Signaling," Telephony, TCX12004, University of Excellence, pp. 5.8–5.17, (Oct. 21, 1991).

Garrahan, J.J., et al., "Intelligent Network Overview," IEEE Communications Magazine, pp. 30–36, (Mar. 1993).

Johnson, M.A., et al., "New Service Testing Functions for Advanced Intelligent Networks," IEEE 1992 Network Operations and Management Symposium, pp. 709–720, (Apr. 6, 1992).

Yeh, S.Y., et al., "The Evolving Intelligent Network Architecture," IEEE Conference on Computer and Communication Systems, pp. 835–839, (1990).

Atoui, M., "Virtual Private Network Call Processing in the Intelligent Network," International Conference on Communications, pp. 561–565, (1992).

Bosco, P., et al., "A Laboratory for AIN Service Design and Validation," International Conference on Communications, pp. 566–571, (Jun. 14, 1992).

Homa, J., et al., "Intelligent Network Requirements for Personal Communications Services," IEEE Communications Magazine, pp. 70–76, (Feb. 1992).

Russo, E.G., et al., "Intelligent Network Platforms in the U.S.," AT&T Technical Journal, pp. 26–43, (1991).

Van Den Broek, W., et al., "Race 2066–Functional models of UMTS and integration into the future networks," Electronics & Communications Engineering Journal, pp. 165–172, (Jun. 1993).

Pinkham, G., et al., "The Ericsson Approach to Intelligent Networks," IEEE Global Telecommunications Conference & Exhibition, Session 10, paragraph 4, pp. 320–324, (1988).

N/A, "ANSI–TI.111–1992, Signaling System No. 7 (SS7)—Message Transfer Part (MTP), " American National Standard for Telecommunications.

N/A, "ANSI–TI.112–1992, Signaling System No. 7 (SS7)—Signaling Connection Control Part (SCCP)," American National Standard for Telecommunications.

N/A, "ANSI–TI.113–1992, Signaling System No. 7 (SS7)—Integrated Services digital Network (ISDN) User Part," American National Standard for Telecommunications.

N/A, "ANSI–TI.113a–1993, Signaling System No. 7 (SS7)—Integrated Services Digital Network (ISDN) User Part (NxDSO Multi–rate Connection)," American National Standard for Telecommunications.

N/A, "ANSI–TI.113–1995, Signaling System No. 7 (SS7)—Integrated Services Digital Network (ISDN) User Part," American National Standard for Telecommunications.

N/A, "ATM at a Glance," Transmission Technologies Access Guide, pp. 40–42, (1993).

Paglialunga, A., "ISCP Baseline Document (Ver 3.1)," ITU Telecommunication Standardization Sector, Centre Studi E Laboratori Telecommunicazioni S.p.A., (1993).

N/A, "A Technical Report on Speech Packetization," Document T1A1/94—Prepared by T1A1.7, Working Group on Specialized Signal Processing.

N//A, "Draft Revised Recommendation I.580," ITU –Telecommunication Standardization Sector, Study Group 13, (Jul. 10–21, 1995).

Sprague, David, "MTP Level–3 Gateway STP Release 3.2.0," Tekelec, pp. 1–48, (Aug. 4, 1995).

McDysan, David E. and Spohn, Darren L., "ATM Theory and Application," ATM Layer VPI/VCI Level Addressing, p. 256: 9.3.1, (1994).

Minoli, Daniel and Dobrowski, George, "Principles of Signaling for Cell Relay and Frame Relay," DVI Comm., Inc. / Stevens Institute of Technology / Bell Comm. Research (Bellcore), pp. 1–2, 5–6 and 229, (1994).

N/A, "B–IDSN ATM Adaptation Layer (AAL) Specification, Types 1 & 2,"ITU Draft Recommendation I.363.1, (Jul. 21, 1995).

N/A, "Circuit Emulation Service Interoperability Specification Version 2.0 (Baseline Draft), 95–1504," The ATM Forum Technical Committee, (Dec. 1995).

N/A, "IN/B–ISDN Signalling Three Ways of Integration," ITU –Telecommunication Standardization Sector, Study Group 11, (Nov. 29 –Dec. 17, 1993).

N/A, "Interworking B–ISUP and Q.93B for DDI, MSN, TP and SUB," ITU –Telecommunication Standardization Sector, Study Group 11, (Nov. 29 –Dec. 17, 1993).

N/A, "Revised Draft of Q.2650 (DSS2/B–ISUP Interworking Recommendation)," ITU –Telecommunication Standardization Sector, Study Group 11, (Nov. 29 –Dec. 17, 1993).

N/A, "Draft Broadband / Narrowband NNI interworking recommendation," ITU –Telecommunication Standardization Sector, Study Group 11, (Dec. 1993).

N/A, "Draft Recommendation Q.2761," ITU –Telecommunication Standardization Sector, Study Group 11, (Nov. 29 –Dec. 17, 1993).

N/A, "Draft Recommendation Q.2762," ITU –Telecommunication Standardization Sector, Study Group 11, (Nov. 29 –Dec. 17, 1993).

N/A, "Q.2931 Overview," ITU –Telecommunication Standardization Sector, (Nov. 29 –Dec. 17, 1993).

N/A, "Clean final draft text for B–ISUP formats and codes (Q.2763) in ASN.1," ITU –Telecommunication Standardization Sector, Study Group 11, (Nov. 29 –Dec. 17, 1993).

N/A, "Updated draft of Q.2764 (BQ.764)," ITU –Telecommunication Standardization Sector, Study Group 11, (Nov. 29 –Dec. 17, 1993).

N/A, "Final B–ISUP SDLs," ITU –Telecommunication Standardization Sector, Study Group 11, (Nov. 29 –Dec. 17, 1993).

N/A, "Draft Recommendation Q.2650," ITU –Telecommunication Standardization Sector, Study Group 11, (Nov. 29 –Dec. 17, 1993).

N/A, "Revision of Recommendation of Q.850," ITU –T SG 11 WP 2, (Dec. 2–15, 1993).

N/A, "Draft Text for Q.2931 (CH. 1,2 and 3)," ITU –Telecommunication Standardization Sector, Study Group 11, (Dec. 1993).

N/A, "Q.2931, Clause 4 –Information Elements," ITU –Telecommunication Standardization Sector, (Nov. 29 –Dec. 17, 1993).

N/A, "Section 5 of Q.93B," ITU –Telecommunication Standardization Sector, Study Group 11, (Nov. 29 –Dec. 17, 1993).

N/A, "Chapter 6 of Recommendation Q.93B," ITU –Telecommunication Standardization Sector, Study Group 11, (Nov. 29 –Dec. 17, 1993).

N/A, "Clauses 7 and 8 of Q.2931," ITU –Telecommunication Standardization Sector, Study Group 11, (Dec. 1993).

N/A, "Revised Q.2931 User Side SDL Diagrams," ITU –Telecommunication Standardization Sector, Study Group 11, (Nov. 29 –Dec. 17, 1993).

N/A, "Revised Q.2931 Network Side SDL Diagrams," ITU –Telecommunication Standardization Sector, Study Group 11, (Nov. 29 –Dec. 17, 1993).

N/A, "AnnexesB, C, D, F, H and I of Q.2931," ITU –Telecommunication Standardization Sector, Study Group 11, (Nov. 29 –Dec. 17, 1993).

N/A, "Annex E of Recommendation Q.93B," ITU –Telecommunication Standardization Sector, Study Group 11, (Nov. 29 –Dec. 17, 1993).

N/A, "Rec. Q.2931, Annex G –Status Monitoring of SPCs," ITU –Telecommunication Standardization Sector, Study Group 11, (Nov. 29 –Dec. 17, 1993).

N/A, "Annex J of Q.2931," ITU –Telecommunication Standardization Sector, Study Group 11, (Dec. 1993).

N/A, "Appendix 1/Q.2931: Guidelines for the Use of Instruction Indicators," ITU –Telecommunication Standardization Sector, Study Group 11, (Nov. 29 –Dec. 17, 1993).

N/A, "Draft text for Q.2931: Appendix II (Information Items Required for Connection Establishment and Routing in B–ISDN)," ITU –Telecommunication Standardization Sector, Study Group 11.

N/A, "General Recommendations on Telephone Switching and Signalling—Intelligent Network / Distributed Functional Plane for Intelligent Newtork CS–1," ITU–T Recommendation Q.1214.

Kuman, Sanjay, "Lagacy Voice Service at a Native ATM Terminal," ATM_Forum/95–0917R1, ATM Forum Technical Committee, (Oct. 2–6, 1995).

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).

Choi, Don, "Requirements for ATM Trunking," ATM_Forum/95–1401, ATM Forum Technical Committee, (Oct. 2–6, 1995).

Chiang, Chin, "Proposed Changes to Proxy Signaling Capability," ATM Forum 95–0046, ATM Forum: Signaling Working Group, (Feb 6–10, 1995).

Amin–Salehi, Bahman, "Third Party Call Setup for a Video–on Demand Connection Establishment," ATM _Forum/95–0022, ATM Forum Technical Committee, (Feb 5–8, 1995).

Caves, Keith, "Proposed Modifications to the Baseline Text (95–0446R2 of the 'VTOA –ATM Trunking for Narrowband Services' Specification," ATM Forum/95–1134, ATM Forum Technical Committee, (Oct. 2–6, 1995).

Schink, Helmut, et al., "CES as a Flexible Trunking Method," ATM_Forum/95–1157, ATM Forum Technical Committee, (Oct. 2–6, 1995).

Duault, Maurice, "Proposal for ATM Trunking Options," ATM_Forum/95–1230, ATMForum Technical Committee, (Oct. 2–6, 1995).

Okutani, Takenori, et al., "VTOA:Reference Configuration––ATM Trunking for Narrowband Services," ATM–Forum/95–1364, ATM Forum Technical Committee, (Oct. 2–6, 1995).

Stodola, Kevin, "Circuit Emulation Services Version 2 Baseline," ATM_Forum/95–1504, ATM Forum Technical Committee, (Dec. 11–15, 1995).

N/A, "I.751 Asynchronous Transfer Mode (ATM) Management View of the Network Element View," ITU–Telecommunication Standardization Sector, Study Group 15, (Nov. 13–24, 1995).

N/A, "Draft I.732," ITU–Telecommunication Standardization Sector, Study Group 15, (Nov. 13–24, 1995).

N/A, "Editorial Modificaitons for Draft New ITU–T Recommendation I.731," ITU–Telecommunication Standardization Sector, Study Group 15, (Nov. 13–24, 1995).

Buhrke, R.E., "Proposed Unified Functional Model," T1S1.5/95–036, Committee T1 Contribution, (Feb. 1995).

Beckman, Richard T. and Matthews, Joseph R. "Proposal for a Physical Architecture Based on the Harmonized Functional Architecture," Committee T1 Contribution T1S1.5/95–027, Bellcore, (Feb. 20, 1995).

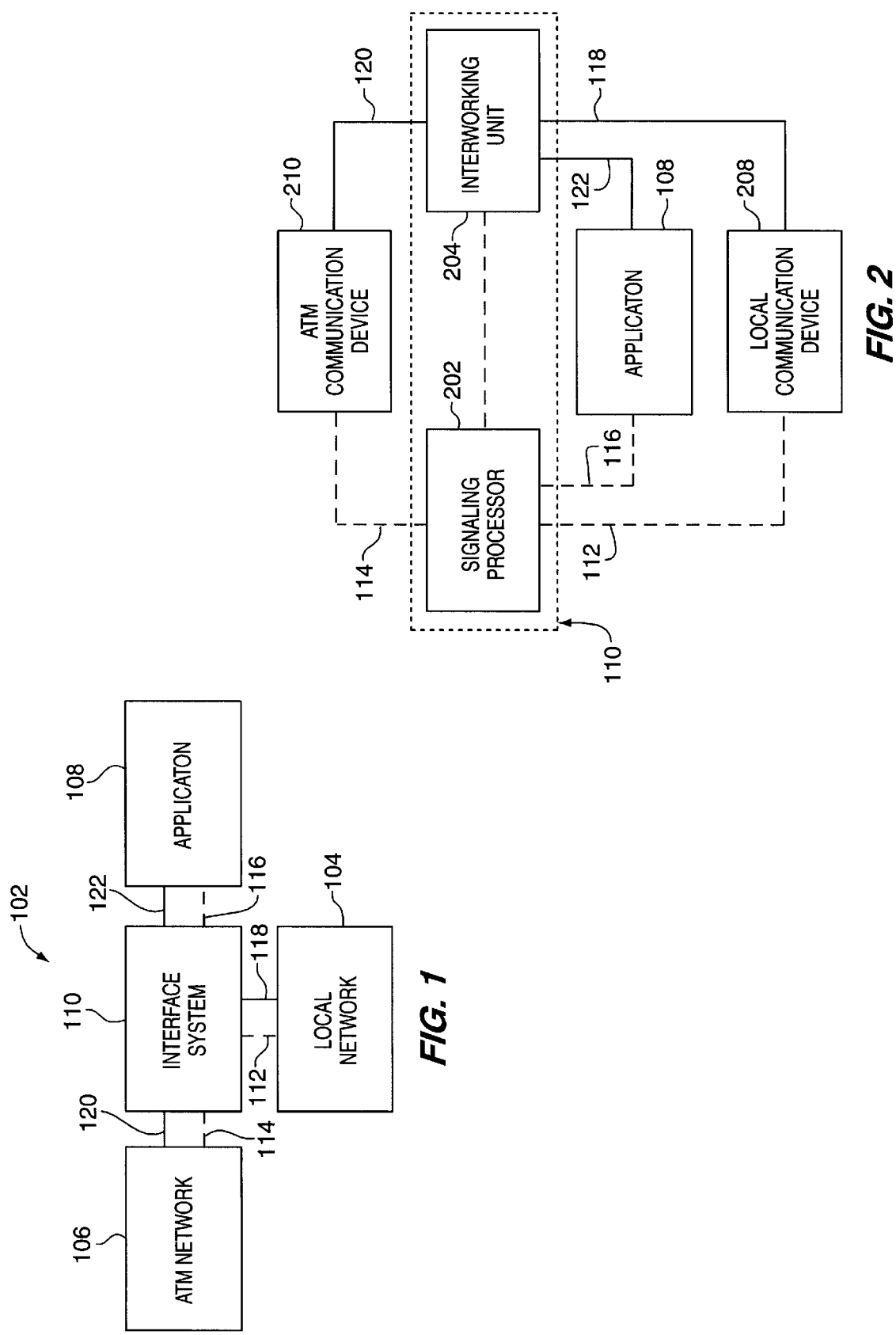

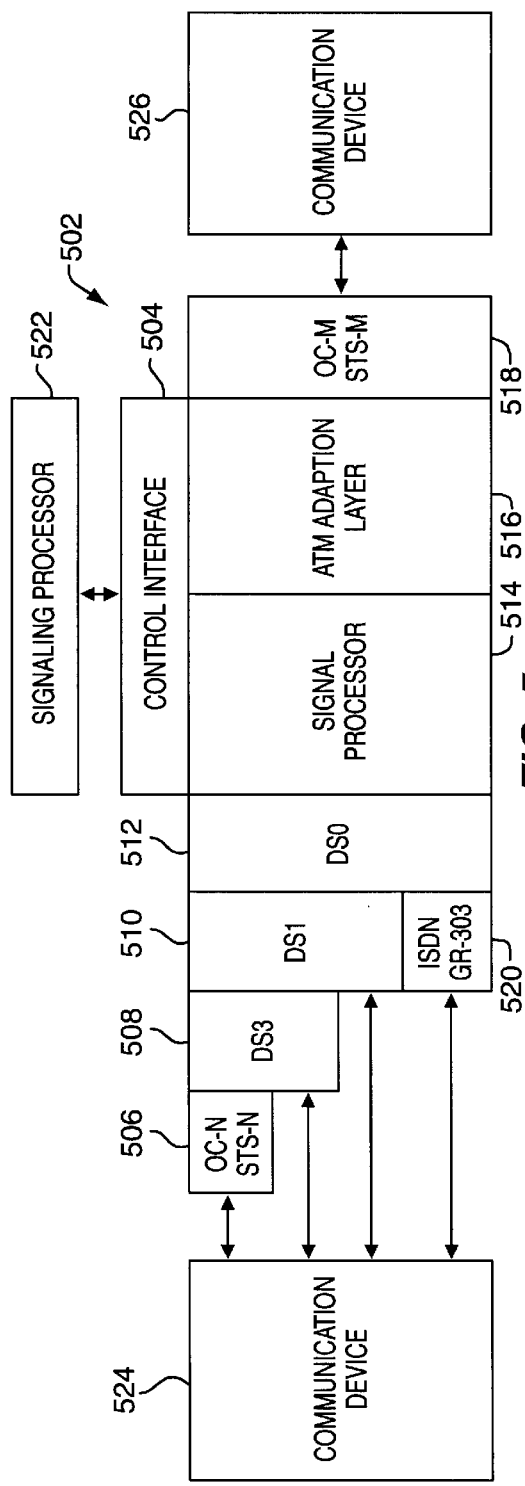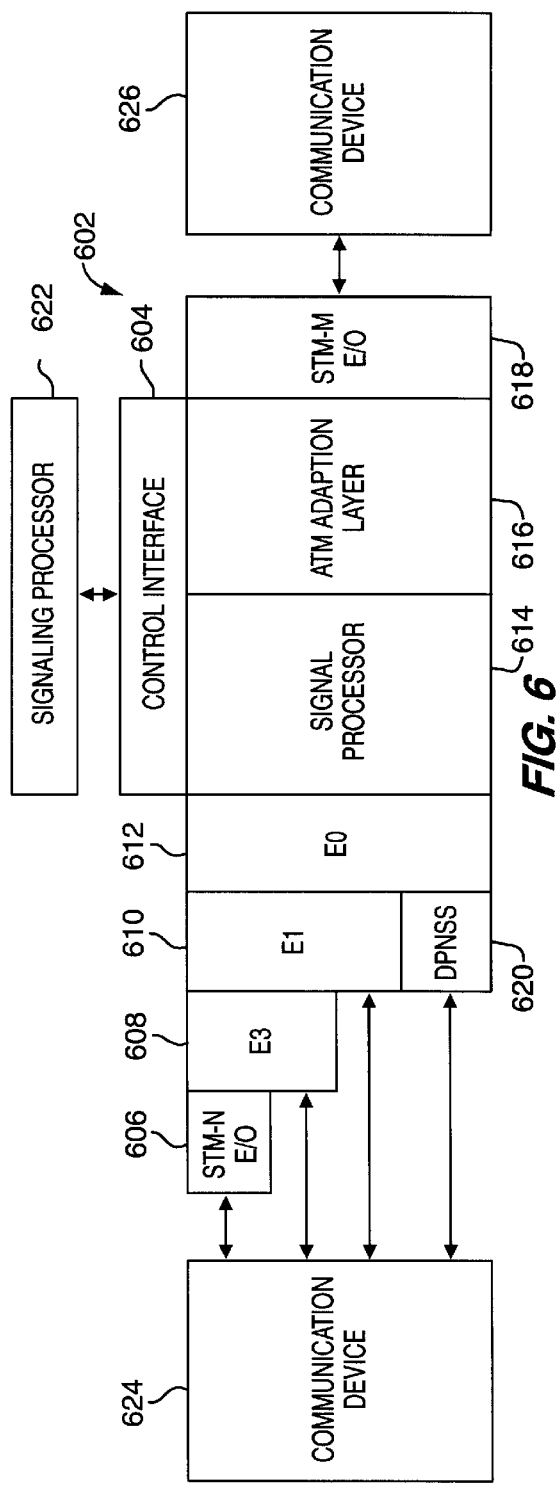

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 10

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

FIG. 11

| EXCEPTION TABLE INDEX | CARRIER SELECTION IDENTIFICATION | CARRIER IDENTIFICATION | CALLED PARTY | | | NEXT FUNCTION | INDEX |
|---|---|---|---|---|---|---|---|
| | | | NATURE OF ADDRESS | DIGITS FROM | DIGITS TO | | |
| | | | | | | | |
| | | | | | | | |

| ANI TABLE INDEX | CALLING PARTY CATEGORY | NATURE OF ADDRESS | CALLING PARTY/CHARGE NUMBER | | | ORIGINATING LINE INFORMATION | NEXT FUNCTION | NEXT INDEX |
|---|---|---|---|---|---|---|---|---|
| | | | DIGITS FROM | DIGITS TO | DATA | | | |
| | | | | | | | | |

FIG. 14

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |

FIG. 15

| ROUTING TABLE INDEX | TRANSIT NETWORK SELECTION | | | | CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|---|
| | NETWORK IDENTIFICATION PLAN | DIGITS FROM | DIGITS TO | | | | | | | | |
| | | | | | | | | | | | |

FIG. 16

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

SYSTEM AND METHOD FOR INTERFACING A LOCAL COMMUNICATION DEVICE

RELATED APPLICATIONS

Not applicable

FEDERALLY SPONSERED RESEARCH OR DEVELOPMENT

Not applicable

MICROFICHE APPENDIX

Not applicable

BACKGROUND OF THE INVENTION

Field of the Invention

The present invention relates to the field of telecommunication communications transport and processing.

SUMMARY OF THE INVENTION

The present invention comprises a system for providing an interface for a call between an asynchronous transfer mode network and a local network. The call has user communications and call signaling. The system comprises a first communication device adapted to communicate the call in an asynchronous transfer mode format and a second communication device adapted to communicate the call in a time division multiplex format. The system further comprises an application adapted to process the call and an interface system. The interface system comprises a signaling processor and an interworking unit. The signaling processor is adapted to receive the call signaling from the first communication device. The signaling processor processes the call signaling to select a first connection to the application and transports a first control message designating the selected first connection. The interworking unit is adapted to receive the user communications from the first communication device and to receive the first control message from the signaling processor. The interworking unit interworks the user communications between the asynchronous transfer mode format and a format usable by the application and transports the user communications over the selected first connection designated in the first control message.

The application processes the call and transports a second control message notifying the signaling processor that processing is complete. The signaling processor then receives the second control message and processes the second control message to select a second connection from the interworking unit to the second communication device. The signaling processor transports a third control message designating the selected second connection. The interworking unit receives the processed user communications and the third control message and interworks the user communications to the selected second connection to the second communication device.

Still further, the present invention is a system for providing an interface for a call between a broadband system and a GR-303 system. The call has user communications and call signaling. The system comprises a signaling processor adapted to process the call signaling to select a broadband connection for the call and to provide a control message that identifies the selected broadband connection. The system has a converter adapted to receive the call signaling from the GR-303 system in a GR-303 format and to provide the call signaling to the signaling processor in a format processable by the signaling processor. The system further comprises an interworking unit adapted to receive user communications in a GR-303 format from the GR-303 system and to receive the control message from the signaling processor. The interworking unit converts the user communications between the GR-303 format and a broadband format and transmits the user communications in the broadband format to the broadband system on the selected broadband connection identified in the control message. The system also comprises a service platform in the broadband system adapted to receive the user communications and to process the user communications with a service application.

Further yet, the present invention comprises a system for providing an interface for a call between an asynchronous transfer mode system that is operable to handle the call and a GR-303 system that is operable to handle the call. The call has user communications and call signaling. The system comprises a service platform adapted to process the call with an interactive application. The system includes a signaling processor that is adapted to process call signaling from the GR-303 system and from the asynchronous transfer mode system. The signaling processor selects at least one of a connection to the asynchronous transfer mode system, the GR-303 system, and the service platform for the call. The signaling processor also provides a control message that identifies the selected connection. In addition, the system comprises an interworking unit that is adapted to receive the control message from the signaling processor and to receive the user communications. The interworking unit interworks the user communications between the GR-303 system, the asynchronous transfer mode system, and the service platform on the selected connection identified in the control message.

The present invention is directed to a system for interworking for a call between an asynchronous transfer mode system and a GR-303 system. The call has call signaling and user communications. The system comprises a service platform adapted to process the call with an interactive application. The system further comprises a converter adapted to exchange the call signaling with the GR-303 system and to interwork call signaling between a GR-303 format and a signaling system #7 format. The system includes a signaling processor and an interworking unit. The signaling processor is adapted to receive call signaling in a signaling system #7 format from the asynchronous transfer mode system and from the converter. The signaling processor processes the call signaling in the signaling system #7 format to select at least one of a connection to the GR-303 system, the asynchronous transfer mode system, and the service platform for the call. The signaling processor provides a control message that identifies the selected connection. The interworking unit adapted to receive the control message from the signaling processor and to interwork the user communications between the GR-303 system, the asynchronous transfer mode system, and the service platform using the selected connection identified in the control message.

In another aspect, the present invention is directed to a system for providing an interface for a call between an asynchronous transfer mode system and a GR-303 system. The call has user communications and call signaling. The system comprises a service platform adapted to process the call with an interactive application, a signaling processor, and an interworking unit. The signaling processor is adapted to exchange call signaling with the asynchronous transfer mode system. The signaling processor processes call signaling from GR-303 system and from the asynchronous transfer mode system to select at least one of a connection for the call to the GR-303 system, the asynchronous transfer mode system, and the service platform. The signaling processor provides a control message that identifies the selected connection. The interworking unit is adapted to exchange the call signaling between the GR-303 system and the signaling processor. The interworking unit receives the control message from the signaling processor and interworks user communications between the GR-303 system, the asynchronous transfer mode system, and the service platform on the selected connection identified in the control message.

In still another aspect, the present invention is directed to a system for providing an interface for a call between a broadband system and a integrated services digital network system. The call has user communications and call signaling. The system comprises a signaling processor adapted to process the call signaling to select a broadband connection for the call and to provide a control message that identifies the selected broadband connection. The system has a converter adapted to receive the call signaling from the integrated services digital network system in a integrated services digital network format and to provide the call signaling to the signaling processor in a format processable by the signaling processor. The system further comprises an interworking unit adapted to receive user communications in a integrated services digital network format from the integrated services digital network system and to receive the control message from the signaling processor. The interworking unit converts the user communications between the integrated services digital network format and a broadband format and transmits the user communications in the broadband format to the broadband system on the selected broadband connection identified in the control message. The system also comprises a service platform in the broadband system adapted to receive the user communications and to process the user communications with a service application.

In yet another aspect, the present invention is directed to a system for providing an interface for a call between an asynchronous transfer mode system that is operable to handle the call and a integrated services digital network system that is operable to handle the call. The call has user communications and call signaling. The system comprises a service platform adapted to process the call with an interactive application. The system includes a signaling processor that is adapted to process call signaling from the integrated services digital network system and from the asynchronous transfer mode system. The signaling processor selects at least one of a connection to the asynchronous transfer mode system, the integrated services digital network system, and the service platform for the call. The signaling processor also provides a control message that identifies the selected connection. In addition, the system comprises an interworking unit that is adapted to receive the control message from the signaling processor and to receive the user communications. The interworking unit interworks the user communications between the integrated services digital network system, the asynchronous transfer mode system, and the service platform on the selected connection identified in the control message.

Further still, the present invention is directed to a system for interworking for a call between an asynchronous transfer mode system and a integrated services digital network system. The call has call signaling and user communications. The system comprises a service platform adapted to process the call with an interactive application. The system further comprises a converter adapted to exchange the call signaling with the integrated services digital network system and to interwork call signaling between a integrated services digital network format and a signaling system #7 format. The system includes a signaling processor and an interworking unit. The signaling processor is adapted to receive call signaling in a signaling system #7 format from the asynchronous transfer mode system and from the converter. The signaling processor processes the call signaling in the signaling system #7 format to select at least one of a connection to the integrated services digital network system, the asynchronous transfer mode system, and the service platform for the call. The signaling processor provides a control message that identifies the selected connection. The interworking unit adapted to receive the control message from the signaling processor and to interwork the user communications between the integrated services digital network system, the asynchronous transfer mode system, and the service platform using the selected connection identified in the control message.

In another aspect, the present invention is directed to a system for providing an interface for a call between an asynchronous transfer mode system and a integrated services digital network system. The call has user communications and call signaling. The system comprises a service platform adapted to process the call with an interactive application, a signaling processor, and an interworking unit. The signaling processor is adapted to exchange call signaling with the asynchronous transfer mode system. The signaling processor processes call signaling from integrated services digital network system and from the asynchronous transfer mode system to select at least one of a connection for the call to the integrated services digital network system, the asynchronous transfer mode system, and the service platform. The signaling processor provides a control message that identifies the selected connection. The interworking unit is adapted to exchange the call signaling between the integrated services digital network system and the signaling processor. The interworking unit receives the control message from the signaling processor and interworks user communications between the integrated services digital network system, the asynchronous transfer mode system, and the service platform on the selected connection identified in the control message.

In another aspect, the present invention comprises a system for providing a tandem connection for a call. The call has call signaling and user communications. The system comprises a first communication device adapted to transport the call as traffic in a GR-303 format and a second communication device adapted to receive the call. The system has a first interworking unit adapted to receive the traffic for the call from the first communication device over a first connection. The first interworking unit converts the traffic from the GR-303 format to asynchronous transfer mode cells that identify a selected second connection identified in a first control message, and transports the asynchronous transfer mode cells. Also included is a cross connect that is adapted to receive the asynchronous transfer mode cells from the first interworking unit and to route the asynchronous transfer mode cells based on the selected second connection identified in the asynchronous transfer mode cells.

A second interworking unit is included in the system and is adapted to receive the asynchronous transfer mode cells from the cross connect over the selected virtual connection. The second interworking unit converts the asynchronous transfer mode cells into a into traffic having a format receivable by the second communication device and transports the traffic over a selected third connection to the second communication device identified in a second control message.

The system further comprises a third communication device and a signaling processor. The third communication device is adapted to receive the asynchronous transfer mode cells from the cross connect over the selected second connection. The signaling processor is linked to the first communication device, the second communication device, the third communication device, first interworking unit, and the second interworking unit.

The signaling processor is adapted to receive and process the call signaling from the first communication device to select the second connection and, if the selected second connection connects cross connect and the second interworking unit, to select the third connection. The signaling processor provides the first control message for the call to the first interworking unit and provides the second control message for the call to one of the second interworking unit and the third communication device.

The first control message identifies the first connection and the selected second connection. The second control message identifies the selected second connection and the third connection. The first connection, the selected second connection, and the selected third connection form a tandem connection.

In still another aspect, the present invention comprises a system for providing a tandem connection for a call. The call has call signaling and user communications. The system comprises a first communication device adapted to transport the call as traffic in a integrated services digital network format and a second communication device adapted to receive the call. The system has a first interworking unit adapted to receive the traffic for the call from the first communication device over a first connection. The first interworking unit converts the traffic from the integrated services digital network format to asynchronous transfer mode cells that identify a selected second connection identified in a first control message, and transports the asynchronous transfer mode cells. Also included is a cross connect that is adapted to receive the asynchronous transfer mode cells from the first interworking unit and to route the asynchronous transfer mode cells based on the selected second connection identified in the asynchronous transfer mode cells.

A second interworking unit is included in the system and is adapted to receive the asynchronous transfer mode cells from the cross connect over the selected virtual connection. The second interworking unit converts the asynchronous transfer mode cells into a into traffic having a format receivable by the second communication device and transports the traffic over a selected third connection to the second communication device identified in a second control message.

The system further comprises a third communication device and a signaling processor. The third communication device is adapted to receive the asynchronous transfer mode cells from the cross connect over the selected second connection. The signaling processor is linked to the first communication device, the second communication device, the third communication device, first interworking unit, and the second interworking unit.

The signaling processor is adapted to receive and process the call signaling from the first communication device to select the second connection and, if the selected second connection connects cross connect and the second interworking unit, to select the third connection. The signaling processor provides the first control message for the call to the first interworking unit and provides the second control message for the call to one of the second interworking unit and the third communication device.

The first control message identifies the first connection and the selected second connection. The second control message identifies the selected second connection and the third connection. The first connection, the selected second connection, and the selected third connection form a tandem connection.

The present invention also comprises an interworking unit for facilitating a call. The interworking unit comprises a control interface adapted to receive a control message for the call that identifies one of an integrated services digital network connection, a GR-303 connection, and a digital service level connection and an asynchronous transfer mode virtual connection selected for the call by a signaling processor. The interworking unit further comprises an asynchronous transfer mode adaptation layer element adapted to interwork the one of the integrated services digital network connection, the GR-303 connection, and the digital service level connection and the selected asynchronous transfer mode connection identified in the control message for the call. The interworking unit further comprises a cross-connect element adapted to receive the one of the integrated services digital network connection, the GR-303 connection, and the digital service level connection and to cross-connect the one of the integrated services digital network connection, the GR-303 connection, and the digital service level connection to the asynchronous transfer mode adaptation layer element.

BRIEF DESCRIPTION OF THE DRAWINGS

FIG. 1 is a block diagram of an interface system interfacing with a local network and with an asynchronous transfer mode network.

FIG. 2 is a block diagram showing the components of the interface system of FIG. 1.

FIG. 5 is a functional diagram of an asynchronous transfer mode interworking multiplexer for use with a synchronous optical network system.

FIG. 6 is a functional diagram of an asynchronous transfer mode interworking multiplexer for use with a synchronous digital hierarchy system.

FIG. 10 is a table diagram of a trunk circuit table used in the signaling processor of FIG. 9.

FIG. 11 is a table diagram of a trunk group table used in the signaling processor of FIG. 9.

FIG. 12 is a table diagram of an exception circuit table used in the signaling processor of FIG. 9.

FIG. 13 is a table diagram of an automated number index table used in the signaling processor of FIG. 9.

FIG. 14 is a table diagram of a called number table used in the signaling processor of FIG. 9.

FIG. 15 is a table diagram of a routing table used in the signaling processor of FIG. 9.

FIG. 16 is a table diagram of a treatment table used in the signaling processor of FIG. 9.

FIG. 17 is a table diagram of a message table used in the signaling processor of FIG. 9.

DETAILED DESCRIPTION OF THE PREFERRED EMBODIMENTS

Figure 3:
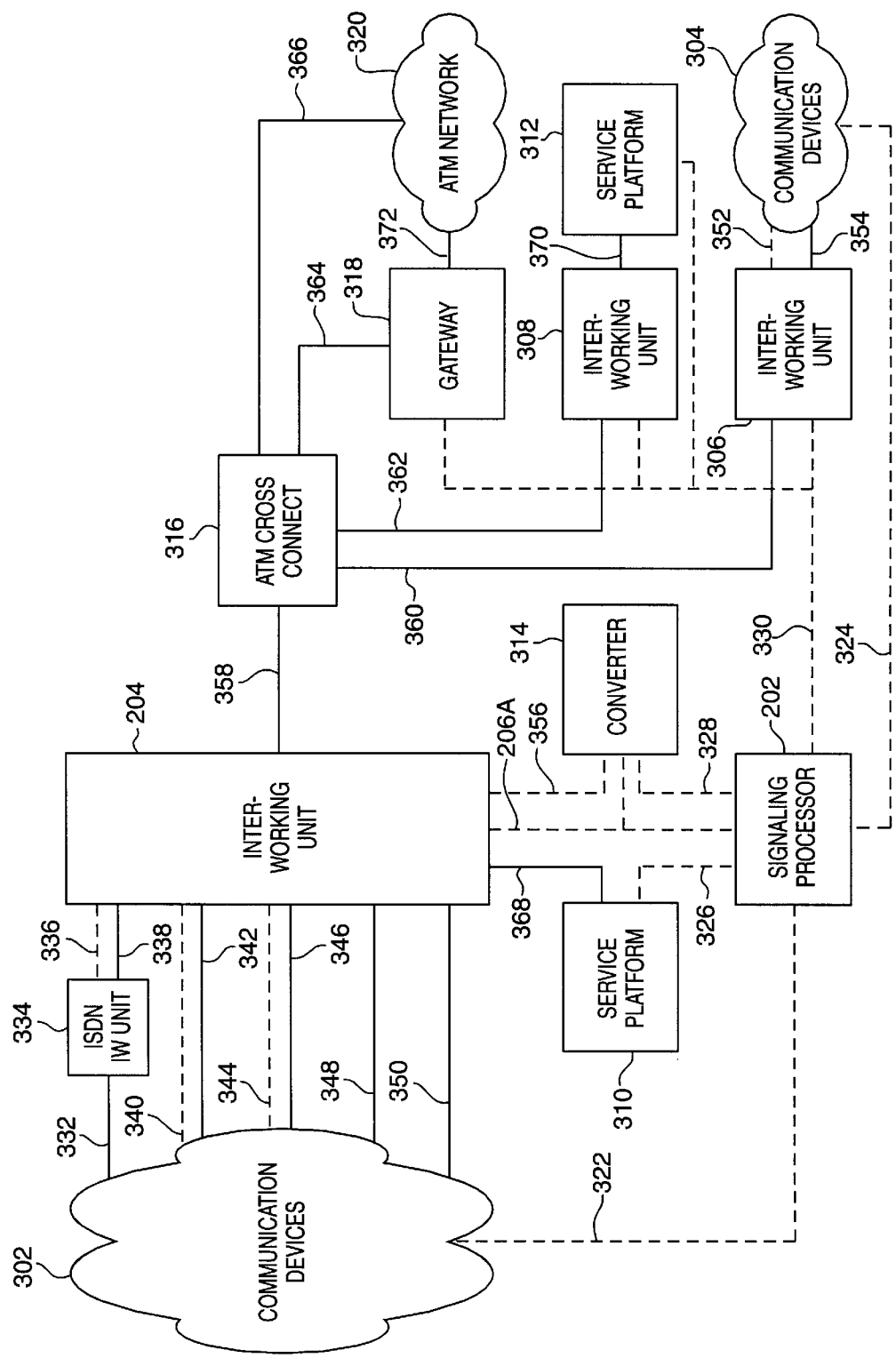
FIG. 3 is a block diagram of an interface system for communicating with applications between local communication devices and high speed asynchronous transfer mode devices in a local services architecture.

Telecommunication systems have a number of communication devices in local exchange and interexchange environments that interact to provide call services to customers. For some calls, traditional services are sufficient to process, route, or connect the call to a designated connection. However, some calls require intelligent network (IN) services and resources to process, route, or connect the call to the correct connection.

Each call has call signaling and user communications. The user communications contain the caller's information, such as a voice communication or data communication, and they are communicated over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.933.

A call can be transmitted from a communication device. A communication device can be, for example, customer premises equipment (CPE), a service platform, a switch, or any other device capable of initiating, handling, or terminating a call. Customer premises equipment can be, for example, a telephone, a computer, a facsimile machine, or a private branch exchange. A service platform can be, for example, a service platform or any other enhanced platform that is capable of processing calls.

Communications devices in both traditional and intelligent systems can use a variety of protocols and methods to achieve a connection for a call or to complete call processing. For example, CPE can be connected to a switch using a time division multiplex (TDM) format, such as super frame (SF) or extended superframe (ESF). The ESF connection allows multiple devices at the customer site to access the local switch and obtain telecommunication services.

Also, communication devices, such as telephones, are likely connected to a remote digital terminal, and the connection typically carries analog signals over twisted pair wires. The remote digital terminals provide a digital interface between the telephones and a local switch by converting the analog signals from the telephones into a multiplexed digital signal to be transferred to the local switch. A common standard for the connection between the remote digital terminal and the local switch is provided in Bellcore Reference GR-TSY-000303 (GR-303).

In addition, communications devices use broadband protocols, such as broadband-integrated services digital network (B-ISDN). Broadband systems provide greater bandwidth than narrowband systems for calls, in addition to providing digital processing of the calls, error checking, and correction. B-ISDN provides a communication device with a digital connection to a local switch or other device. The B-ISDN loop provides more bandwidth and control than a convention local loop. Digital Ipersonal network signaling system (DPNSS), the European equivalent of B-ISDN, and other broadband protocols, can also be used.

Moreover, other communication devices use circuit-based connections for calls. For example, digital signal (DS) level communications, such as digital signal level 3 (DS3), digital signal level one (DS1), and digital signal level zero (DS0) are conventional circuit-based connections. European level four (E4), European level three (E3), European level one (E1), European level zero (E0), and other European equivalent circuit-based connections, also are used.

High speed electrical/optical transmission protocols also are used by communications devices for switching and signaling. The synchronous optical network (SONET) protocol, which is used primarily in North America, and the synchronous digital hierarchy (SDH) protocol, which is used primarily in Europe, are examples of high speed electrical/optical protocols. The SONET and SDH protocols describe the physical media and transmission protocols through which the communications take place. SONET includes optical transmission of optical carrier (OC) signals and electrical transmission of synchronous transport signals (STSs). SONET signals transmit at a base rate of 51.84 Mega-bits per second (Mbps) for optical carrier level one (OC-1) and synchronous transport signal level one (STS-1). Also transmitted are multiples thereof, such as an STS level three (STS-3) and an OC level three (OC-3) at rates of 155.52 Mbps and an STS level twelve (STS-12) and an OC level 12 (OC-12) at rates of 622.08 Mbps, and fractions thereof, such as a virtual tributary group (VTG) at a rate of 6.912 Mbps.

SDH includes transmission of optical synchronous transport module (STM O) signals and electrical synchronous transport module (STM E) signals. SDH signals transmit at a base rate of 155.52 Mbps for synchronous transport module level one electrical and optical (STM-1 E/O). Also transmitted are multiples thereof, such as an STM level four electrical/optical (STM-4 E/O) at rates of 622.08 Mbps, and fractions thereof, such as a tributary unit group (TUG) at a rate of 6.912 Mbps.

Asynchronous transfer mode (ATM) is one technology that is being used in conjunction with SONET and SDH to provide broadband call switching and call transport for telecommunication services. ATM is a protocol that describes communication of user communications in ATM cells. Because the protocol uses cells, calls can be transported on demand for connection-oriented traffic, connectionless-oriented traffic, constant-bit traffic, variable-bit traffic including bursty traffic, and between equipment that either requires timing or does not require timing.

ATM systems handle calls over switched virtual paths (SVPs) and switched virtual circuits (SVCs). The virtual nature of ATM allows multiple communication devices to use a physical communication line at different times. This type of virtual connection more efficiently uses bandwidth, and thereby provides more cost efficient transport for customer calls, than permanent virtual circuits (PVCs) or other dedicated circuits.

The ATM system is able to connect a caller from an origination point to a destination point by selecting a connection from the origination point to the destination point. The connection contains a virtual path (VP) and a virtual channel (VC). A VC is a logical unidirectional connection between two end points for the transfer of ATM cells. A VP is a logical combination of VCs. The ATM system designates the selected connection by specifying a virtual path identifier (VPI) that identifies the selected VP and a virtual channel identifier (VCI) that identifies the selected VC within the selected VP. Because ATM connections are unidirectional, bidirectional communications in an ATM system usually require companion VPIs/VCIs.

Intelligent network resources that provide call routing, call connecting services, and call processing for various protocols, such as those described above, can be located in various exchanges. Because resources are allocated at different exchanges, rarely used or expensive resources may be unavailable to many calls, while inexpensive or often used resources may be overused. It will be appreciated that the communication devices of the local exchange networks can be used more effectively and efficiently, and call routing and call processing can be completed more effectively and efficiently, if a system was developed that can interact with the various protocols in a telecommunication network and concentrate resources.

Therefore, there is a need for a system that concentrates access to system resources for traditional and intelligent services from multiple local exchanges so that calls can be connected through communication devices that have different resource needs or different protocol requirements. There is a need for a system that can pull the elements of a local exchange together so that expensive resources are as equally accessible as inexpensive resources for a call. The present system fills this need.

THE EMBODIMENTS OF FIGS. 1–4

The system of the present invention pulls resources of a local exchange environment together so that the resources are readily accessible for all call connections. The system concentrates the communication devices and resources by moving calls across ATM connections. In this manner, expensive services and resources are as accessible to calls as inexpensive services and resources.

In addition, the system ties into resources having telephony applications as well as non-telephony applications. The system accomplishes, for example, voice and data integration and call processing in telephony applications, in addition to such services as internet services for non-telephony applications.

FIG. 1 illustrates a local services architecture (LSA) system in accordance with the present invention. The LSA system 102 has a local network 104, an ATM network 106, an application 108, and an interface system 110. The interface system 110 is linked to the local network 104 by a link 112, to the ATM network 106 by a link 114, and to the application 108 by a link 116. The interface system 110 is connected to the local network 104 by a connection 118, to the ATM network 106 by a connection 120, and to the application 108 by a connection 122.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as SS7, C7, ISDN, B-ISDN, GR-303, local area network (LAN), or data bus call signaling. A link can be, for example, an AAL5 data link, UDP/IP, ethernet, or DS0 over T1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, a control or signaling signal, or signaling instructions, whether proprietary or standardized, that convey information from one point to another.

Connections are used to transport user communications and other device information between the elements and devices of the LSA system 102. The term "connection" as used herein means the transmission media used to carry user communications between communication devices or between the elements of the LSA system 102. For example, a connection could carry a user's voice, computer data, or other communication device data. A connection can be associated with either in-band communications or out-of-band communications.

The local network 104 has one or more communication devices (not shown) that originate, terminate, or handle a call. The call can have various protocols, such as the protocols discussed above.

The ATM network 106 is a high-speed transfer network. The ATM network 106 can transport calls over a connection to other local networks, to interexchange networks, or to other ATM networks. In addition, the ATM network 106 is adapted to transport calls to ATM communication devices (not shown) that originate, terminate, or handle a call.

The application 108 processes calls or converts transmission protocols so that calls can be transferred to another local network, to another ATM network, or to an interexchange network. In some instances, a local network is connected directly to the application 108. In such a case, the application 108 interworks the call from one protocol to another and transports the call to the local network. In other cases, the application 108 is a service platform or service application that processes the call. Such processing occurs, for example, for class service processing such as call forwarding, caller identification, or voice recognition processing.

The interface system 110 interworks calls between the ATM network 106, the local network 104, and the application 108. The interface system 110 interworks calls, including call signaling and user communications, dynamically on a call-by-call basis in TDM-ATM networks, ATM-ATM networks, and TDM-TDM networks.

Interworking is a process of converting one protocol to another. For example, ISDN signaling can be interworked with SS7 signaling by converting ISDN signaling to analogous SS7 signaling and by converting SS7 signaling to analogous ISDN signaling. Interworking is also completed on user communications. For example, user communications can be interworked between ATM cells having an identified VPI/VCI and DS0 connections in the TDM format.

The interface system 110 can interwork call signaling between the SS7 format and the GR-303 format, between the SS7 format and the ISDN format, and between the GR-303 format and the ISDN format. In addition, the interface system 110 can user communications between the GR-303 format and the ATM format, between the ISDN format and the ATM format, and between the GR-303 format and the ISDN format. Moreover, the interface system 110 can convert the call between an optical format and an electrical format.

The interface system 110 controls call routing, call processing, and call transport. The interface system 110 determines the processing or transport needs of a call, and it provides routing instructions or processing instructions to the communication devices in the ATM network 106, the local network 104, and the application 108.

The interface system 110 operates to accept call signaling and user communications from either the ATM network 106 or the local network 104. The interface system 110 processes the call signaling to determine the routing and processing requirements of the call. Based upon the processed call signaling, the interface system 110 selects a connection to the required network 106 or 104 for connection of the call or to the required application 108 for processing. The interface system 110 then interworks the user communications to the selected connection.

The interface system 110 can be configured to be a tandem interface to implement a tandem function. A tandem configuration allows the interface system 110 to concentrate telecommunication traffic between networks, switches, and communication devices. The tandem configuration allows any one network to connect a call to any other network without having a direct connection between each network and communication device. Thus, each network and communication device are connected to each other through the interface system 110.

FIG. 2 illustrates an expanded view of the interface system 110. The interface system 110 includes a signaling processor 202 and an interworking unit 204 linked by a link 206. The interface system 110 communicates with a local communication device 208 in the local network 104 through its respective link 112 and connection 118, and to an ATM communication device 210 in the ATM network 106 through its respective link 114 and connection 120. (See FIG. 1.)

The signaling processor 202 is a signaling platform that can receive and process signaling. Based on the processed signaling, the signaling processor 202 selects processing options for the user communications and generates and transmits control messages that identify the communication device, processing option, service, or resource that is to be used. The signaling processor 202 also selects virtual connections and circuit-based connections for call routing and generates and transports control messages that identify the selected connection. The signaling processor 202 can process various forms of signaling, including ISDN, SS7, and C7. A preferred signaling processor is discussed below.

The interworking unit 204 interworks traffic between various protocols. Preferably, the interworking unit 204 interworks between ATM traffic and non-ATM traffic. The interworking unit 204 operates in accordance with control messages received from the signaling processor 202 over the link 206. These control messages are typically provided on a call-by-call basis and identify an assignment between a DS0 and a VPI/VCI for which user communications are interworked. In some cases, the interworking unit 204 is configured to implement digital signal processing as instructed in the control messages from the signaling processor 202. Examples of digital signal processing include echo cancellation, continuity testing, and call trigger detection.

The local communication device 208 is any communication device that operates in the local network 104 (FIG. 1). The local communication device 208 can be, for example, CPE, a service platform, a switch, or any other device capable of initiating, handling, or terminating a call. Customer premises equipment can be, for example, a telephone, a computer, a facsimile machine, or a private branch exchange. A service platform can be, for example, a service platform or any other enhanced platform that is capable of processing calls.

The ATM communication device 210 is any communication device that operates in the ATM network 106 (FIG. 1). The ATM communication device 210 can be, for example, CPE, a service platform, a switch, or any other device capable of initiating, handling, or terminating a call having ATM cells.

The system of FIG. 2 operates as follows. The local communication device 208 can initiate a call in, for example, a TDM format over a DS0. The call signaling is transmitted to the signaling processor 202 over the link 112 therebetween, and the user communications are transmitted to the interworking unit 204 over the connection 118 therebetween.

The signaling processor 202 processes the call signaling and determines the routing and processing requirements for the call. In the present example, first, the signaling processor 202 determines that the call requires processing in the application 108. Such a case can occur, for example, if voice recognition services are required or if some other service from a service platform is required. Alternately, the application 108 can act as a protocol converter.

The signaling processor 202 sends a control message to the interworking unit 204 identifying the selected connection 122 to the application. At the same time, the signaling processor 202 transmits a control message to the application 108 over the link 116 identifying the selected processing option with which the application 108 will process the user communications.

The interworking unit 204 receives the user communications over the connection 118. In addition, the interworking unit 204 receives the control message from the signaling processor 202 over the link 206. The interworking unit 204 makes the selected connection 122 so that the user communications are transported to the application 108. The interworking unit 204 completes any format conversion that is required. In the present example, the application 108 receives the user communications in the TDM format, so no conversion is required.

After the application 108 completes the call processing, it transfers a control message to the signaling processor 202. The control message from the application 108 notifies the signaling processor that service is complete and contains any information that the signaling processor 204 requires to complete call routing or to control further call processing.

The signaling processor 202 determines that the call is to be connected to the ATM communication device 210. The signaling processor 202 sends a control message to the interworking unit 204 identifying the selected connection 120 to the ATM communication device 210. In addition, the signaling processor 202 notifies the ATM communication device 210 over the link 114 that user communications are being transported to the ATM communication device.

The interworking unit 204 receives the control message from the signaling processor identifying the selected connection 120. The interworking unit 204 then converts the user communications that are being received on the DS0 connection 118 to ATM cells that identify the selected connection 120 to the ATM communication device 210. The ATM cells are then transported to the ATM communication device 210 over the selected connection 120.

It will be appreciated that the description of the operation of the system of FIG. 2 incorporates a service platform as the application 108 and TDM communications over a DS0 from the local communication device 208. However, it will be appreciated that the local communication device 208 can transmit user communications in an ESF or SF format, other TDM formats over DS level transmission lines or over SONET or SDH, an ISDN format, or a GR-303 format, to name some examples. Moreover, the application 108 can be a converter that can interwork between signaling formats, a converter that can interwork between user communication formats, or any service application.

In addition, for some calls, the application 106 will not be required. The interface system 110 then will make the connection initially to the ATM communication device 210.

FIG. 3 illustrates many components of the LSA system 102 as they interact. The LSA system 102 has a first and second network cloud that represents one or more communication devices 302 and 304. The LSA system 102 has a signaling processor 202 and an interworking unit 204 that are similar to the signaling processor and interworking unit described above. The system has a second interworking unit 306 and a third interworking unit 308 that are equivalent to the interworking unit 204.

A first service platform 310 and a second service platform 312 provide application services for calls in the LSA system 102. A converter 314 converts between signaling formats. An ATM cross connect 316 routes calls on provisioned connections. A gateway 318 is included to change ATM cell headers to identify selected connections to the ATM network 320.

The signaling processor 202 is linked to the interworking unit 204 by a link 206A. The link can be an SS7 link, a DS0, UDP/IP, TCP/IP over ethernet, or a bus arrangement using a conventional bus protocol.

The signaling processor 202 is linked to the communication devices by a link 322 and 324, to the service platform 310 through a link 326, and to the converter 314 through a link 328. The converter 314 also in linked to the interworking unit 204 and to the signaling processor 202 through a link 206A. The signaling processor 202 also is linked through a link 330 to the gateway 318, to the interworking units 306 and 308, and to the service platform 312. Although the link 330 is illustrated as a local area network (LAN) link, it will be appreciated that the link 330 can be separate transmission media having separate protocols.

The communication devices 302 communicate to the interworking unit 204 using various protocols. The communication devices 302 can transmit a call using ESF/SF over an ESF/SF connection 332. The ESF/SF format would be converted at an ISDN interworking (IW) unit 334 to an ISDN format. Because ISDN has both bearer channels (B) to transport user communications and a signaling channel (D) to transport signaling, a connection 336 communicates the user communications from the ISDN IW unit 334 to the interworking unit 204, and a link 338 communicates the signaling.

In addition, the communication devices 302 can transport GR-303 signaling over a link 340 and GR-303 user communications over a connection 342. Alternately, the communication devices 302 can transport ISDN signaling over a link 344 and ISDN user communications over a connection 346. In addition, the communication devices 302 can transport high speed communications over a DS3 connection 348 or over a SONET OC-3 connection 350. It will be appreciated that the DS3 connection 348 can be a higher or lower speed connection, and that it can be a European equivalent connection. In addition, it will be appreciated that the OC-3 connection 350 can be a higher or lower speed optical or electrical connection, and that it can be a European equivalent SDH connection.

A respective link 352 and connection 354 connect the interworking unit 306 and the communication devices 304. Although the same number of links and connections exist between the interworking unit 306 and the communication devices 304 as between the interworking unit 204 and the communication devices 302, only one each are shown for clarity. In addition, a link 356 exists between the interworking unit 204 and the converter 314.

A connection 358 connects the interworking unit 204 and the ATM cross connect 316. In addition connections 360, 362, 364, and 366 connect the ATM cross connect 316 with the interworking unit 306, the interworking unit 308, the gateway 318, and the ATM network 320. Also, a connection 368 connects the interworking unit 204 with the service platform 310, a connection 370 connects the interworking unit 308 with the service platform 312, and a connection 372 connects the gateway 318 with the ATM network 320.

The signaling processor 202 is operational to process signaling. The signaling processor 202 will typically process an SS7 initial address message (IAM) for call set-up. The signaling information is processed by signaling processor 202 in order to select a particular connection for a particular call or to select a particular processing option for a particular call. This connection might be a DS0 or a VPI/VCI. The signaling processor 202 sends control messages to the interworking unit 204 identifying the selected connections. In addition, the signaling processor sends control messages to the other devices identifying selected connections or selected processing options.

In particular, the signaling processor 202 has a service application coordinator that determines which service in the service platforms 310 and 312 is to process a particular call. In addition, the signaling processor 202 has a service coordinator that controls the service application coordinator to make sure conflicts do not arise in processing different calls with the same service platform 310 and 312 or the same service application on the same service platform 310 and 312. The service coordinator can be a resource database that tracks allocations of resources on the service platforms 310 and 312 for calls and manages the allocations of the resources based on the information it holds. A detailed description of the signaling processor follows below.

As explained above, the interworking unit 204 interworks traffic between various protocols. Preferably, the interworking unit 204 interworks between ATM traffic and non-ATM traffic. The interworking unit 204 operates in accordance with control messages received from the signaling processor 202 over the link 206. These control messages are typically provided on a call-by-call basis and identify an assignment between a DS0 and a VPI/VCI for which user communications are interworked. In some cases, the interworking unit 204 is configured to implement digital signal processing as instructed in the control messages from the signaling processor 202. Examples of digital signal processing include echo cancellation, continuity testing, and call trigger detection. In some case, the interworking unit 204 transports signaling between the communication devices 302 and the converter 314.

The communication device 302 and 304 can be an ESF/SF or ISDN CPE, a service platform, a switch, a remote digital terminal, or any other device capable of initiating, handling, or terminating a call. CPE can be, for example, a telephone, a computer, a facsimile machine, or a private branch exchange. A service platform can be, for example, a service platform or any other enhanced platform that is capable of processing calls. A remote digital terminal is a device that concentrates analog twisted pairs from telephones and other like devices and converts the analog signals to a digital format known as GR-303.

The service platforms 310 and 312 provide enhanced services for call processing for user communications received from the interworking units 204 and 306. The service platforms 310 and 312 may have one or multiple applications to provide multiple services. Such services may include voice messaging, facsimile messaging, mail boxes, voice recognition, conference bridging, calling card, menu routing, N00 servicing such as freephone and 900 call servicing, prepay card, tone detection, and call forwarding.

The service platforms 310 and 312 process the user communications in accordance with the control messages from the signaling processor 326. The control message instructs the service platforms 310 and 312 how to process the user communications and which application to use in the service platform to process the user communications. The service platforms 310 and 312 process the user communications, return processing results to the signaling processor 326, and return the processed user communications to the interworking units 204 and 306 through respective connections 368 and 370 to be transported to another network device.

The converter 314 interworks signaling from one format to another. The converter communicates with the signaling processor 202 and the interworking unit 204 over the link 206A. The converter 314 interworks between GR-303 signaling and SS7 signaling. The converter 314 exchanges GR-303 signaling with the communication devices 302 over the link 340 and through the interworking unit 204 and the link 356. The converter 314 exchanges SS7 signaling with signaling processor 326 over the link 328. GR-303 relies on the LAPD and Q.931 protocols established for ISDN D channel signaling. Devices that convert ISDN D channel signaling into the SS7 format are known. One skilled in the art will appreciate how such a device could be adapted to convert GR-303 signaling into the SS7 format.

The converter 314 also interworks between ISDN signaling and SS7 signaling. The converter 314 exchanges D channel signaling with the ISDN IW unit 334 over the link 336 and through interworking unit 204 over the link 356. Alternately, the converter 314 exchanges D channel signaling with the communication devices 302 over the link 344 and through the interworking unit 204 over the link 356. The converter 314 exchanges SS7 signaling with signaling processor 202 over the link 328. Devices with the base functionality of the converter 314 are known in the art. One skilled in the art will appreciate how this functionality can be adapted to support the invention In some embodiments, the converter 314 will generate and transmit control instructions to the interworking unit 204 over the link 356 instructing the interworking unit to collect DTMF input from a caller. This will typically occur in response to a set-up message. After these digits are collected by the interworking unit 204, the converter 314 will receive a message from the interworking unit over the link 356 that identifies the digits dialed by the caller. These digits will be incorporated into an SS7 message sent to the signaling processor 202.

The converter 314 may also instruct the interworking unit 204 to provide ringback to the caller at the far end of the call. The interworking unit 204 would provide a ringback to the caller at the far end that indicates the called party at the near end was being alerted. Where appropriate, a busy signal may be provided. The converter 314 may also instruct the interworking unit 204 to provide the caller's number to the called party. This could be used for the caller ID feature.

The ATM cross connect 316 is any device that provides a plurality of ATM virtual connections between the interworking units 204, 306, and 308, the gateway 318, and the ATM network 320. An example of an ATM cross connect is the NEC Model 20. In ATM, virtual connections can be designated by the VPI/VCI in the cell header. The ATM cross connect 316 can be configured to provide a plurality of VPI/VCI connections between the LSA system devices.

The following examples illustrate a possible configuration. VPI "A" can be provisioned from the interworking unit 204 through the ATM cross connect 316 to the interworking unit 306. VPI "B" can be provisioned from the interworking unit 204 through the ATM cross connect 316 and to the interworking unit 308. VPI "C" can be provisioned from the interworking unit 204 through the ATM cross connect 316 and back to the interworking unit 204. VPI "D" can be provisioned from the interworking unit 204 through the ATM cross connect 316 and to the gateway 318. VPI "E" can be provisioned from the interworking unit 204 through the ATM cross connect 316 and to the ATM network 320. Similarly, VPIs can be provisioned between any of the other devices in the LSA network, including the interworking units 306 and 308, the gateway 318, and the ATM network 320. In this way, the selection of the VPI essentially selects the outgoing connection to the outgoing device. The VCIs can be used to differentiate individual calls on the VPIs.

DS3, DS1, and DS0 connections are bi-directional, whereas ATM connections are uni-directional. This means that the bi-directional connections will typically require two ATM connections—one in each direction. This can be accomplished by assigning a companion VPI/VCI to each VPI/VCI used for call set-up. The interworking units can be configured to invoke the companion VPI/VCI in order to provide a return path for the bi-directional connection.

In some cases, the signaling processor 202, one or more of the interworking units 204, 306, and 308, and the ATM cross connect 316 form a tandem interface. For example, the signaling processor 202, the interworking unit 204, the ATM cross connect 316, the interworking unit 306, and the interworking unit 308 form a tandem interface between the communication devices 302, the communication devices 304 and the service platform. It will be appreciated that the combination of the devices can be adjusted to include a tandem interface function to the gateway 318 and the ATM network 320 through the ATM cross connect 316.

In some embodiments, the signaling processor 202, the interworking units 204, 306, and 308, and the ATM cross connect 316 will all be physically located at the same site. For example, a tandem system would occupy a single site just as a circuit switch occupies a single site. In this way, a tandem system, such as the system described in FIG. 2, physically and functionally emulates a tandem circuit switch. However, the component nature of the LSA system 102 allows the tandem system to be distributed if desired. For example, in alternative embodiments, the interworking units 204, 306, and 308 and the ATM cross connect 316 will be physically located at the same site, but the signaling processor 202 will be located at a remote site.

The gateway 318 modifies cell header VPI/VCI identifiers. The gateway 318 receives user communications in ATM cells from the ATM cross connect 316 and receives signaling from the signaling processor 202. In addition, the gateway 318 receives both signaling and user communications in ATM cells from the ATM network 320.

The gateway 318 uses the information in the signaling to change the VPI/VCI in the ATM cell header. When the gateway 318 changes the VPI/VCI of the cell header, it changes the connection identification for the ATM cells containing the user communications. Thus, the gateway 318 assists in routing ATM cells between the LSA network 102 and the ATM network 320 and between devices in the LSA system 102 on a call-by-call basis. By changing the addressing of the ATM cells in such a manner, greater access is provided to other local networks, to ATM networks, and to IXC networks because node addressing can be changed and is, therefore, not limited to a low number of addressing nodes.

The LSA system 102 of FIG. 3 operates as follows. Any service can be used for any call. Moreover, any device can be used to connect any call. For example, the interworking unit 204, the ATM cross connect 316, and the gateway 318 can be used to connect a call form the communications devices 302 to the ATM network 320. Alternately, the interworking unit 204, the ATM cross connect 316, and the interworking unit 308 can be used to connect a call from the communication devices 302 to the service platform 312. In addition, the interworking unit 204, the ATM cross connect 316, and the interworking unit 306 can be used to connect a call from the communication devices 302 to the communication devices 304. In the same manner, the devices in the LSA system 102 can be used to connect calls between the communication devices 304 and the ATM network 320, between the communication devices 304 and the service platform 310, between the communication devices 302 and the service platform 312, and between other devices.

Moreover, the converter 314 and the interworking unit 204 can be used to transport and interwork signaling with the signaling processor 202. For example, ISDN signaling and GR-303 signaling is interworked with SS7 signaling by the converter 314.

In the LSA system 102, ESF/SF CPE in the communications devices 302 can communicate with other system devices. In one instance, an ESF/SF CPE initiates a call over the connection 332. The call has in-band signaling. The call is converted by the ISDN IW unit 334 to ISDN signaling that is communicated on the link 336 and to ISDN bearer channel user communications that is communicated on the connection 338. Both the signaling and the user communications are transported to the interworking unit 204.

The interworking unit 204 transfers the signaling to the converter 314 over the link 356. The converter 314 converts the ISDN signaling to analogous SS7 signaling that is transmitted to the signaling processor 202 over the link 328. The signaling processor 202 processes the signaling to determine a connection. The signaling processor 202 transmits a control message to the interworking unit 204 with the selected connection 338. Based on the control message, the interworking unit 204 interworks the user communications from ISDN to ATM cells that identify the selected connection 358 and transports the ATM cells on the selected connection. From there, the ATM cross connect 316 routes the ATM cells on the selected provisioned connection. The selected provisioned connection can be, for example, the connection 364 to the gateway 318.

GR-303 devices in the communications devices 302 also can connect calls to other system devices. In one instance, a GR-303 device initiates a call. The GR-303 signaling is transported over the link 340 to the interworking unit 204. The GR-303 user communications are transported over the connection 342 to the interworking unit 204.

The interworking unit 204 transfers the signaling to the converter 314 over the link 356. The converter 314 converts the GR-303 signaling to analogous SS7 signaling that is transmitted to the signaling processor 202 over the link 328. The signaling processor 202 processes the signaling to determine a connection. The signaling processor 202 transmits a control message to the interworking unit 204 with the selected connection 338.

Based on the control message, the interworking unit 204 interworks the user communications from GR-303 to ATM cells that identify the selected connection 358 and transports the ATM cells on the selected connection. From there, the ATM cross connect 316 routes the ATM cells on the selected provisioned connection. The selected provisioned connection can be, for example, the connection 360 to the interworking unit 306 that leads to a TDM device in the communication devices 304. In such a case, the interworking unit 306 interworks the ATM cells to a selected DS0 connection designated by a control message from the signaling processor 202. The interworking unit 306 then transports the TDM formatted user communications on the connection 354 and transports the signaling on the link 352.

In addition, an ISDN CPE in the communications devices 302 can initiate a call. The ISDN CPE would transmit the signaling on the link 344 and the user communications on the bearer channel over the connection 346. The interworking unit 204 receives both the signaling and the user communications. The interworking unit 204 transfers the signaling to the converter 314 over the link 356. The converter 314 converts the ISDN signaling to analogous SS7 signaling that is transmitted to the signaling processor 202 over the link 328. The signaling processor 202 processes the signaling to determine a connection. The signaling processor 202 transmits a control message to the interworking unit 204 with the selected connection 338.

The interworking unit 204 interworks the user communications from ISDN to ATM cells that identify the selected connection 358 and transports the ATM cells on the selected connection. From there, the ATM cross connect 316 routes the ATM cells on the selected provisioned connection. The selected provisioned connection can be, for example, the connection 362 to the interworking unit 308 that leads to the service platform 312. If the service platform 312 is ATM capable, no interworking is required. The interworking unit 308 would transmit the user communication over the connection 370. If the service platform 312 is a TDM device, the interworking unit 308 will interwork the ATM cells to the DS0 that leads to the service platform.

Of course, other TDM devices can initiate a call over a DS3 connection 348 or an OC-3 connection 350. The call will be handled by the interworking unit 204 and the signaling processor 202 similar to the methods described above.

However, if the call is transmitted over an optical medium, such as the OC-3 connection 350, the interworking unit 204 would convert the call to an electrical format. This can be accomplished through conventional optical-to-electrical converters. Calls connected from the interworking unit 204 to an optical device over the OC-3 connection 350 will be converted to the optical format by using a conventional electrical-to optical converter.

In either the case of the connection 348 over the DS3, or the connection 350 over the OC-3 that has been converted to the electrical format, the signaling and the user communications are demultiplexed to a DS0 level. Likewise, connections to a device in the communications devices 302 over the DS3 connection 348 or the OC-3 connection, before it is converted to the optical format, first are multiplexed from a DS0 to the required DS or OC level.

Figure 4:
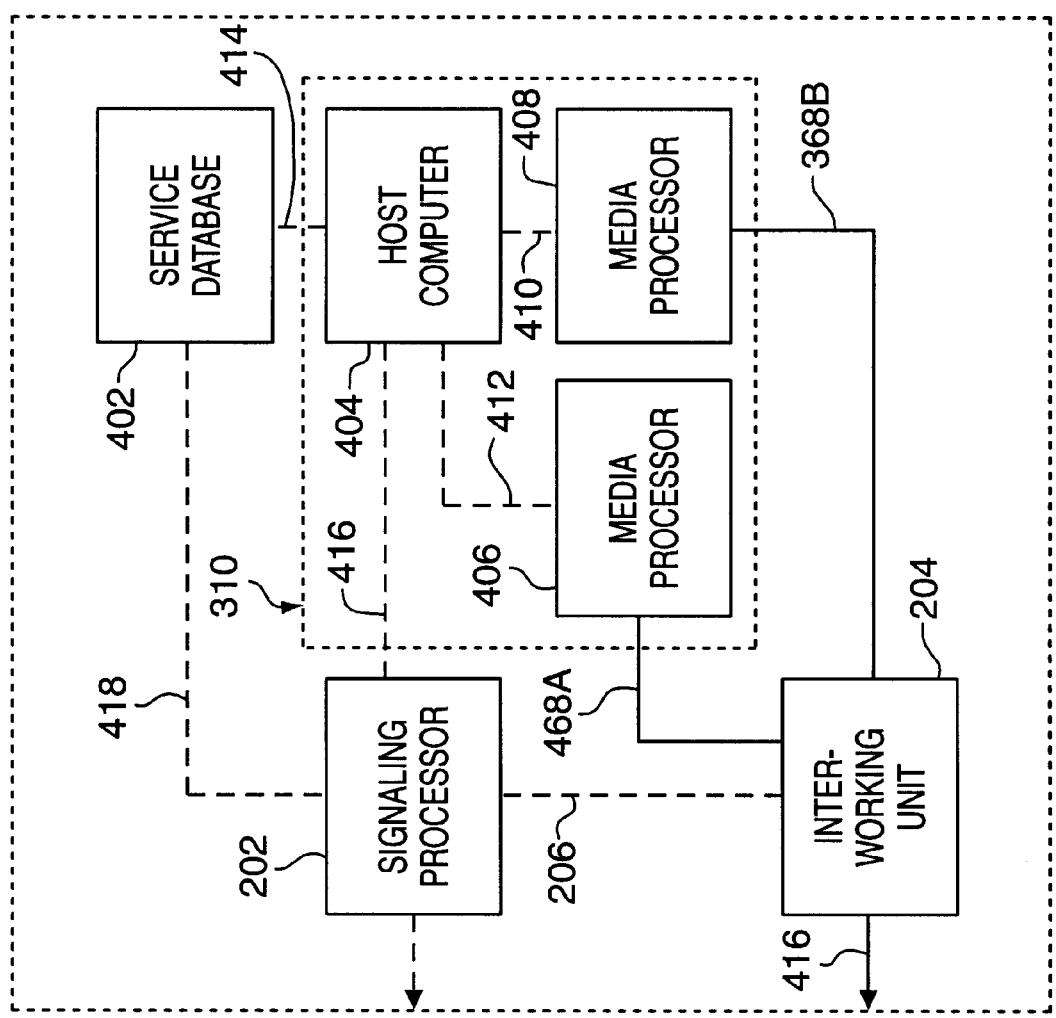
FIG. 4 is a block diagram of a service platform system with an extended asynchronous transfer mode system.

FIG. 4 illustrates the components and the operation of the service platforms 310 and 312 of FIG. 3 within the LSA system 102. Because the service platforms 310 and 312 are the same, only the service platform 310 will be described. The service platform 310 contains a service database 402, a host computer 404, a first media processor 406, and a second media processor 408. However, a service platform can have greater or fewer media processors in addition to other devices.

The host computer 404 communicates with the first media processor through a link 410, to the second media processor 408 through a link 412, and to the service database 402 through a link 414. Preferably, links 410, 412, and 414 are either a LAN or a data bus.

The signaling processor 202 communicates with the host computer 404 through a link 416 and the service database 402 through the link 418. User communications are carried between the telecommunication network elements on connections. The interworking unit 204 communicates to the communication devices 302 through various connections, to the first media processor 406 through a connection 368A, and to the second media processor 408 through a connection 368B.

The host computer 404 is the service node manager that controls every device on the service node or service platform 310. The host computer 404 receives a processor control message from the signaling processor 202. The processor control message instructs the host computer 404 how to process the user communications and which application to use in the media processors 406 and 408 to process the user communications. The host computer 404 controls the user communications processing in the media processors 406 and 408 and returns processed data results to the signaling processor 202 in a host computer data signal. The host computer 404 may instruct the media processors 406 and 408 to return the processed user communications to the interworking unit 204 to be transmitted back to the communication devices 302. The host computer 404 also may send a host control message to the signaling processor 202 with control instructions such as a service complete message or a service change request message.

The service database 402 is a logically centralized data storage device from which the signaling processor 202 or the host computer 404 can retrieve device data. The service database 402 has two aspects of a user or device profile. First, the service database 402 has service subscription data and processing options which denote the services to which a particular call, communication device, or other device has access. Second, the service database 402 has service data which is stored on behalf of a communication device or other device. Service data includes such information as voice messages, facsimile messages, and electronic mail.

The media processors 406 and 408 contain applications that process the user communications. The media processors 406 and 408 perform such processing as tone detection and collection. The media processors collect any information from the user communications that is required to complete an application or manipulate the user communications. The media processors 406 and 408 run applications that process voice, tones, in-band data streams, or out-of-band data. The media processors 406 and 408 report the processing results of the processed data to the host computer 404 or to the signaling processor 202 in a media data signal. In some instances, raw data from the user communications is transferred to the host computer 404 for further processing.

The communication devices 302 may transmit a call. The call signaling is transmitted to the signaling processor 202 so that the signaling processor 202 can route the call to the appropriate device. The user communications are transmitted to the interworking unit 204 to be transported to an appropriate service, such as the media processors 406 and 408. After the user communications are processed, they are transmitted from the media processors 406 or 408, through the interworking unit 204, and back to the communication devices 302. The communication devices 302 can transmit the call in a variety of formats, including SF, ESF, ISDN, B-ISDN, and GR-303 and over a variety of transmission media including TDM, SONET, and SDH.

Referring still to FIG. 4, the operation of the service platform 310 allows the signaling processor 202 to control the host computer 404 and the media processors 406 and 408 that process user communications which pass through the system. The signaling processor 202 selects connections as needed to connect the devices in the LSA system 102.

A call is received into the service platform 310 from the communication devices 302. The call signaling is transmitted from communication device 302 to the signaling processor 202. The user communications are transmitted in ATM cells from the communication devices 302 to the interworking unit 204.

The signaling processor 202 processes the call characteristic of the call signaling. Based on the processing of the call characteristics, the signaling processor 202 determines which service the call requires and which host computer and media processor and which application in the media processor can provide the service.

However, sometimes the call characteristics are not sufficient to determine the specific communication device or other device that is requesting a service or to determine the specific requested service desired. This may occur, for example, when a device dials an "800" number to gain access to a calling card service. In such a situation, the call does not contain the device's OPC and other routing label information that allows the signaling processor to determine the device designation. The signaling processor 202 then may invoke applications in the signaling processor 202 or in the media processor 406 that can interact with the call to determine the device identity or desired service.

In addition, the signaling processor 202 may query a signal control point (SCP) (not shown) or the service database 402 through the link 418. This would allow the signaling processor 202 to gain service options, service data, and routing information for the call to determine the required combination of signal processing, database, and connection providing elements to provide a service.

The call signaling is processed and the signaling processor 202 determines the resource needed to process the service request. The signaling processor 202 then sends a processor control message to the selected host computer 404 designating the application that is to process the user communications. In addition, based on the processed call signaling, the signaling processor 202 selects a connection from the interworking unit 204 to the media processor 406 selected to process the user communications. The signaling processor 202 sends a processor control message to the interworking unit 204 designating the selected connection and instructing the interworking unit 204 to dynamically connect the call in real time to the media proccessor 406 on the connection and to convert the user communications in the interworking unit 204 from the ATM cells to a format that is compatible with the selected media processor 406.

The interworking unit 204 receives both the user communications from the communication devices 302 and the processor control message from the signaling processor 202. The interworking unit 204 converts the ATM cells containing the user communications to a form that is compatible with the selected media processor 406. Generally, the ATM cells are converted into a TDM format. The interworking unit 204 then uses the information gained from the processor control message to route the user communications to the selected media processor 406 over the selected connection.

The user communications are received in the selected media processor 406. In addition, the host computer 404 transmits a host control message to the media processor 406 instructing the media processor 406 which application to use and providing other control messages to control the processing of the user communications. The media processor 406 processes the user communications in accordance with the control instructions from the host computer 404. The media processor 406 then reports the processing results to the host computer 404 in a media processor signal. In addition, the media processor 406 transmits the processed user communications to the interworking unit 204.

The host computer 404 can further service the processing results. The host computer 404 transfers the processing results, with or without further servicing, to the signaling processor 202 in a host control message. The host control message may request that the host computer 404 and the associated media processor 406 be released because processing is complete or it can request another service or media processor 408. When the signaling processor 202 receives the host control message, it may direct the interworking unit 204 to transfer the processed user communications to the communication devices 302 or to another communication device. In addition, the signaling processor 202 may direct the interworking unit 204 to transfer the processed user communications to another service platform or another media processor 408 on the same service platform 310. If the processing is complete, the interworking unit 204 will be instructed by the signaling processor 202 to release the connection to the media processor 406, at which point the connection will be released.

The Interworking Unit Embodiments of FIGS. 5–6

FIG. 5 shows one embodiment of an ATM interworking multiplexer (mux) 502 that is suitable for the present invention, but other multiplexers that support the requirements of the invention are also applicable. The ATM interworking mux 502 has a control interface 504, an OC-N/STS-N interface 506, a DS3 interface 508, a DS1 interface 510, a DS0 interface 512, a signal processor 514, an ATM adaptation layer (AAL) 516, an OC-M/STS-M interface 518, and an ISDN/GR-303 interface 520.

The control interface 502 accepts control messages from the signaling processor 522. In particular, the control interface 504 identifies DS0 connections and virtual connection assignments in the control messages from the signaling processor 522. These assignments are provided to the AAL 516 for implementation.

The OC-N/STS-N interface 506, the DS3 interface 508, the DS1 interface 510, the DS0 interface 512, and the ISDN/GR-303 interface 520 each can accept calls, including user communications, from a communication device 524. Likewise, the OC-M/STS-M interface 518 can accept calls, including user communications, from a communication device 526.

The OC-N/STS-N interface 506 accepts OC-N formatted communication signals and STS-N formatted communication signals and converts the communication signals from the OC-N or STS-N formats to the DS3 format. The DS3 interface 508 accepts communication signals in the DS3 format and converts the communication signals to the DS1 format. The DS3 interface 508 can accept DS3s from the OC-N/STS-N interface 506 or from an external connection. The DS1 interface 510 accepts the communication signals in the DS1 format and converts the communication signals to the DS0 format. The DS1 interface 510 can accept DS1s from the DS3 interface 508 or from an external connection. The DS0 interface 512 accepts communication signals in the DS0 format and provides an interface to the AAL 516. The ISDN/GR-303 interface 520 accepts communication signals in either the ISDN format or the GR-303 format and converts the communication signals to the DS0 format. In addition, each interface may transmit signals in like manner to the communication device 524.

The OC-M/STS-M interface 518 is operational to accept ATM cells from the AAL 516 and to transmit the ATM cells over the connection to the communication device 526. The OC-M/STS-M interface 518 may also accept ATM cells in the OC or STS format and transmit them to the AAL 516.

The AAL 516 comprises both a convergence sublayer and a segmentation and reassembly (SAR) sublayer. The AAL 516 is operational to accept call origination device information in the DS0 format from the DS0 interface 512 and to convert the call origination device information into ATM cells. AALs are known in the art and information about AALs is provided by International Telecommunications Union (ITU) document I.363, which is hereby incorporated fully herein by reference. An AAL for voice communication signals is described in U.S. patent application Ser. No. 08/395,745, which was filed on Feb. 28, 1995, and entitled "Cell Processing for Voice Transmission," and which is incorporated herein by reference.

The AAL 516 obtains from the control interface 504 the virtual path identifier (VPI) and the virtual channel identifier (VCI) for each DS0 for each call connection. The AAL 516 also obtains the identity of the DS0 for each call (or the DS0s for an N×64 call). The AAL 516 then transfers the call origination device information between the identified DS0 and the identified ATM virtual connection. An acknowledgment that the assignments have been implemented may be sent back to the signaling processor 522 if desired. Calls with multiple 64 Kilo-bits per second (Kbps) DS0s are known as N×64 calls. If desired, the AAL 516 can be configured to accept control messages through the control interface 504 for N×64 calls.

As discussed above, the ATM interworking mux 502 also handles calls in the opposite direction, that is, in the direction from the OC-M/STS-M interface 518 to the DS0 interface 512, including calls exiting from the DS1 interface 510, the DS3 interface 508, the OC-N/STS-N interface 506, and the ISDN/GR-303 interface 520. For this traffic, the VPI/VCI has been selected already and the traffic has been routed through the cross-connect (not shown). As a result, the AAL 516 only needs to identify the preassigned DS0 for the selected VPI/VCI. This can be accomplished through a look-up table. In alternative embodiments, the signaling processor 522 can provide this DS0-VPI/VCI assignment through the control interface 504 to the AAL 516.

A technique for processing VPI/VCIs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions will typically be required for each DS0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to invoke automatically this second VPI/VCI to provide a bidirectional virtual connection to match the bi-directional DS0 on the call.

In some embodiments, it may be desirable to incorporate digital signal processing capabilities at the DS0 level. For example, in the present invention, digital signal processing is used to detect the call trigger. It may also be desired to apply echo cancellation or encryption to selected DS0 circuits. In these embodiments, a signal processor 514 would be included either separately (as shown) or as a part of the DS0 interface 512. The signaling processor 522 would be configured to send control messages to the ATM interworking mux 502 to implement particular features on particular DS0 circuits.

FIG. 6 shows another embodiment of an ATM interworking multiplexer (mux) 602 that is suitable for the present invention. The ATM interworking mux 602 has a control interface 604, an STM-N electrical/optical (E/O) interface 606, an E3 interface 608, an E1 interface 610, an E0 interface 612, a signal processor 614, an ATM adaptation layer (AAL) 616, an STM-M electrical/optical (E/O) interface 618, and a digital private network signaling system (DPNSS) interface 620.

The control interface 604 accepts control messages from the signaling processor 622. In particular, the control interface 604 identifies E0 connections and virtual connection assignments in the control messages from the signaling processor 622. These assignments are provided to the AAL 616 for implementation.

The STM-N E/O interface 606, the E3 interface 608, the E1 interface 610, the E0 interface 612, and the DPNSS interface 620 each can accept calls, including user communications, from a second communication device 624. Likewise, the STM-M E/O interface 618 can accept calls, including user communications, from a third communication device 626.

The STM-N E/O interface 606 accepts STM-N electrical or optical formatted communication signals and converts the communication signals from the STM-N electrical or STM-N optical format to the E3 format. The E3 interface 608 accepts communication signals in the E3 format and converts the communication signals to the E1 format. The E3 interface 608 can accept E3s from the STM-N E/O interface 606 or from an external connection. The E1 interface 610 accepts the communication signals in the E1 format and converts the communication signals to the E0 format. The E1 interface 610 can accept E1s from the STM-N E/O interface 606 or the E3 interface 608 or from an external connection. The E0 interface 612 accepts communication signals in the E0 format and provides an interface to the AAL 616. The DPNSS interface 620 accepts communication signals in the DPNSS format and converts the communication signals to the E0 format. In addition, each interface may transmit signals in a like manner to the communication device 624.

The STM-M E/O interface 618 is operational to accept ATM cells from the AAL 616 and to transmit the ATM cells over the connection to the communication device 626. The STM-M E/O interface 618 may also accept ATM cells in the STM-M E/O format and transmit them to the AAL 616.

The AAL 616 comprises both a convergence sublayer and a segmentation and reassembly (SAR) sublayer. The AAL 616 is operational to accept call origination device information in the E0 format from the E0 interface 612 and to convert the call origination device information into ATM cells.

The AAL 616 obtains from the control interface 604 the virtual path identifier and the virtual channel identifier for each call connection. The AAL 616 also obtains the identity of each call. The AAL 616 then transfers the call origination device information between the identified E0 and the identified ATM virtual connection. An acknowledgment that the assignments have been implemented may be sent back to the signaling processor 622 if desired. If desired, the AAL 616 can be configured to accept control messages through the control interface 604 for N×64 calls.

As discussed above, the ATM interworking mux 602 also handles calls in the opposite direction, that is, in the direction from the STM-M E/O interface 618 to the E0 interface 612, including calls exiting from the E1 interface 610, the E3 interface 608, the STM-N E/O interface 606, and the DPNSS interface 620. For this traffic, the VPI/VCI has been selected already and the traffic has been routed through the cross-connect (not shown). As a result, the AAL 616 only needs to identify the pre-assigned E0 for the selected VPI/VCI. This can be accomplished through a look-up table. In alternative embodiments, the signaling processor 622 can provide this VPI/VCI assignment through the control interface 604 to the AAL 616.

E0 connections are bi-directional and ATM connections typically are unidirectional. As a result, two virtual connections in opposing directions typically will be required for each E0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to automatically invoke this second VPI/VCI to provide a bi-directional virtual connection to match the bi-directional E0 on the call.

In some instances, it may be desirable to incorporate digital signal processing capabilities at the E0 level. For example, in the present invention, digital signal processing is used to detect the call trigger. Also, it may be desirable apply echo cancellation. In these embodiments, a signal processor 614 would be included either separately (as shown) or as a part of the E0 interface 612. The signaling processor 622 would be configured to send control messages to the ATM interworking mux 602 to implement particular features on particular circuits.

THE SIGNALING PROCESSOR OF FIGS. 7–17

The signaling processor is referred to as a call/connection manager (CCM), and it receives and processes telecommunications call signaling and control messages to select connections that establish communication paths for calls. In the preferred embodiment, the CCM processes SS7 signaling to select connections for a call. CCM processing is described in a U.S. Patent Application having attorney docket number 1148, which is entitled "Telecommunication System," which is assigned to the same assignee as this patent application, and which is incorporated herein by reference.

In addition to selecting connections, the CCM performs many other functions in the context of call processing. It not only can control routing and select the actual connections, but it can also validate callers, control echo cancelers, generate billing information, invoke intelligent network functions, access remote databases, manage traffic, and balance network loads. One skilled in the art will appreciate how the CCM described below can be adapted to operate in the above embodiments.

Figure 7:
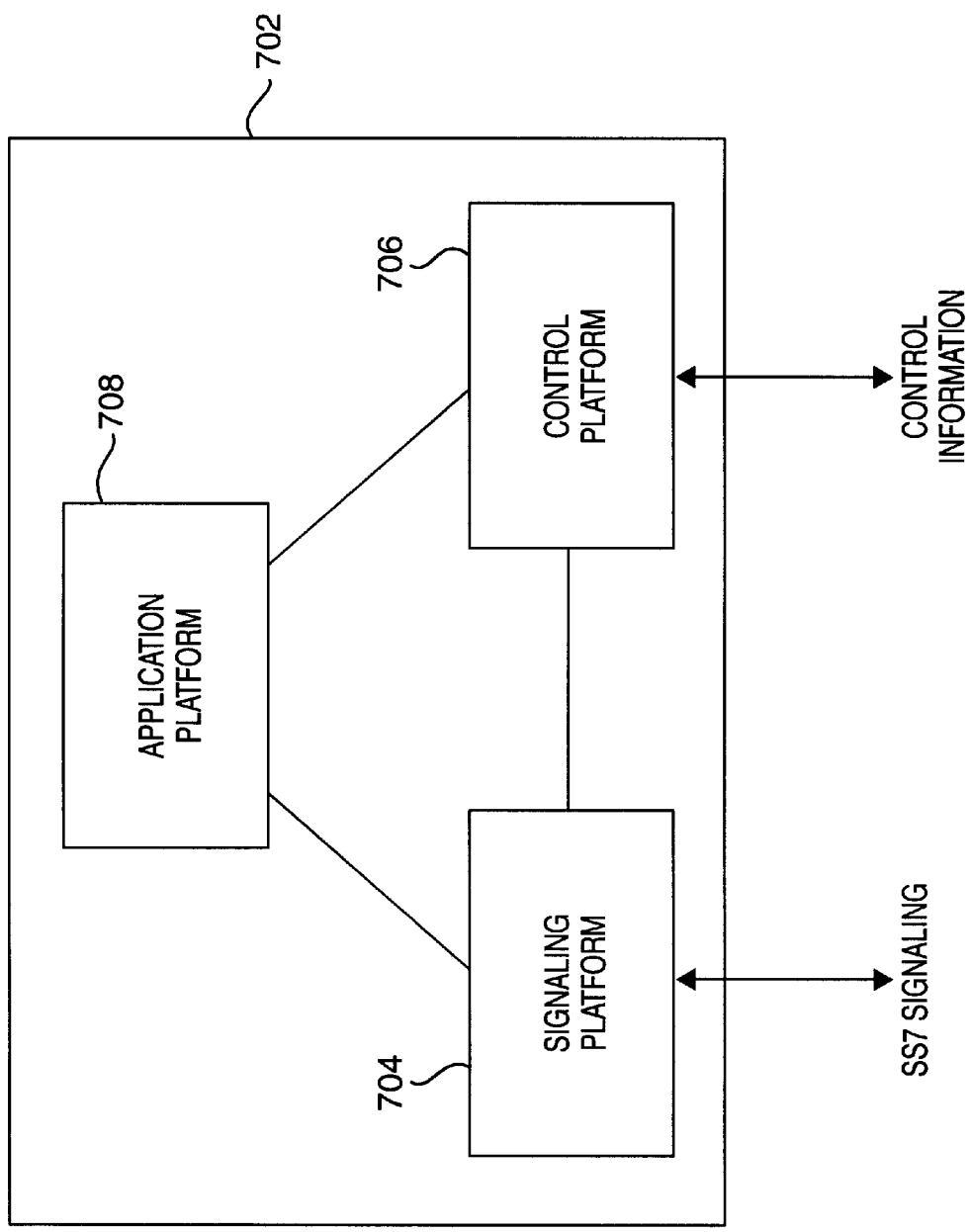
FIG. 7 is a block diagram of a signaling processor constructed in accordance with the present system.

FIG. 7 depicts a version of the CCM. Other versions are also contemplated. In the embodiment of FIG. 7, the CCM 702 controls an ATM interworking multiplexer (mux) that performs interworking of DS0s and VPI/VCIs. However, the CCM may control other communications devices and connections in other embodiments.

The CCM 702 comprises a signaling platform 704, a control platform 706, and an application platform 708. Each of the platforms 704, 706, and 708 is coupled to the other platforms.

The signaling platform 704 is externally coupled to the SS7 systems—in particular to systems having a message transfer part (MTP), an ISDN user part (ISUP), a signaling connection control part (SCCP), an intelligent network application part (INAP), and a transaction capabilities application part (TCAP). The control platform 706 is externally coupled to a mux control, an echo control, a resource control, billing, and operations.

The signaling platform 704 comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

The control platform 706 is comprised of various external interfaces including a mux interface, an echo interface, a resource control interface, a billing interface, and an operations interface. The mux interface exchanges messages with at least one mux. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of the CCM 702. One skilled in the art will appreciate how to produce the software for the interfaces in the control platform 706.

The application platform 708 is functional to process signaling information from the signaling platform 704 in order to select connections. The identity of the selected connections are provided to the control platform 706 for the mux interface. The application platform 708 is responsible for validation, translation, routing, call control, exceptions, screening, and error handling. In addition to providing the control requirements for the mux, the application platform 708 also provides requirements for echo control and resource control to the appropriate interface of the control platform 706. In addition, the application platform 708 generates signaling information for transmission by the signaling platform 704. The signaling information might be ISUP, INAP, or TCAP messages to external network elements. Pertinent information for each call is stored in a call control block (CCB) for the call. The CCB can be used for tracking and billing the call.

The application platform 708 operates in general accord with the Basic Call Model (BCM) defined by the ITU. An instance of the BCM is created to handle each call. The BCM includes an originating process and a terminating process. The application platform 708 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for the application platform 708 can be produced in specification and description language (SDL) defined in ITU-T Z.100. The SDL can be converted into C code. Additional C and C++ code can be added as required to establish the environment.

The CCM 702 can be comprised of the above-described software loaded onto a computer. The computer can be an Integrated Micro Products (IMP) FT-Sparc 600 using the Solaris operating system and conventional database systems. It may be desirable to utilize the multi-threading capability of a Unix operating system.

From FIG. 7, it can be seen that the application platform 708 processes signaling information to control numerous systems and facilitate call connections and services. The SS7 signaling is exchanged with external components through the signaling platform 704, and control information is exchanged with external systems through the control platform 706. Advantageously, the CCM 702 is not integrated into a switch CPU that is coupled to a switching matrix. Unlike an SCP, the CCM 702 is capable of processing ISUP messages independently of TCAP queries.

SS7 MESSAGE DESIGNATIONS

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR Circuit Group Query Response
CRM—Circuit Reservation Message
CRA—Circuit Reservation Acknowledgment
CVT Circuit Validation Test
CVR—Circuit Validation Response
CFN—Confusion
COT—Continuity
CCR—Continuity Check Request
EXM—Exit Message
INF Information
INR Information Request
IAM—Initial Address
LPA Loop Back Acknowledgment
PAM—Pass Along
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

CCM TABLES

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 8:
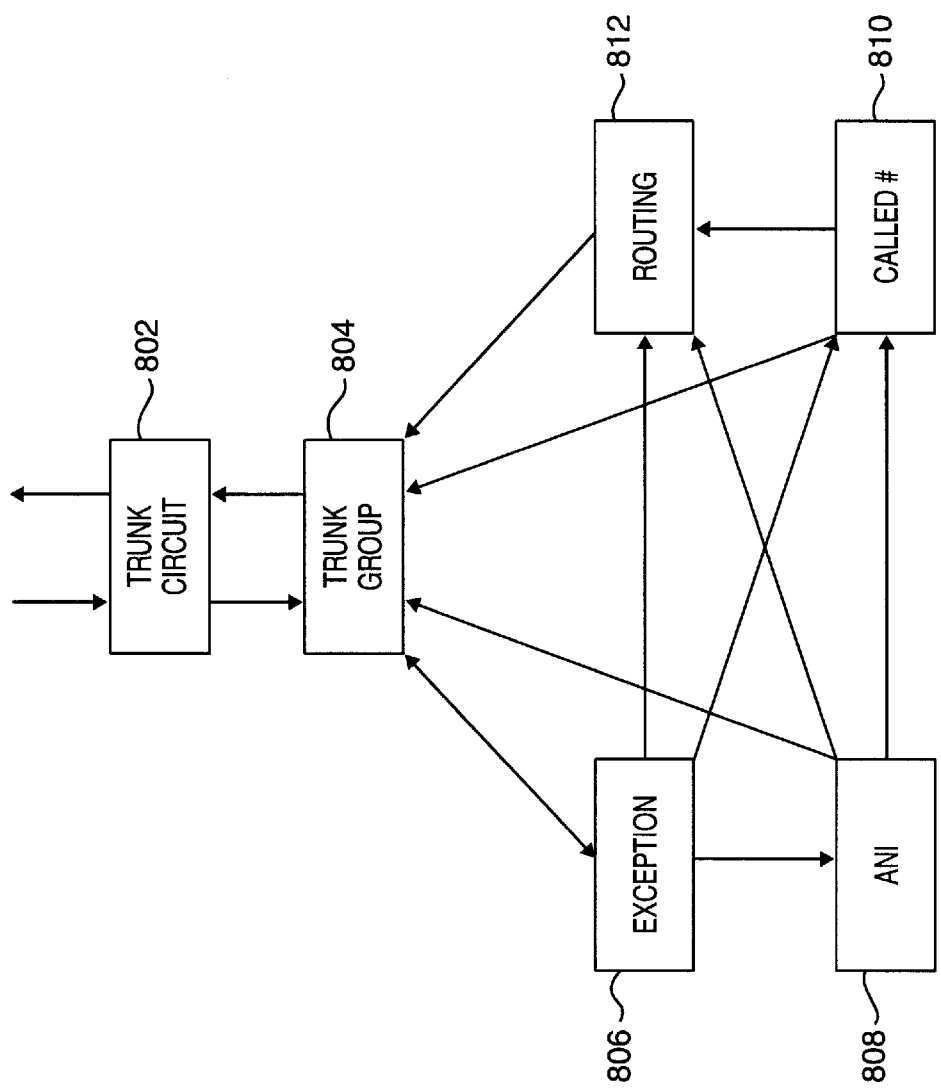
FIG. 8 is a block diagram of a data structure having tables that are used in the signaling processor of FIG. 7.

FIG. 8 depicts a data structure used by the application platform 708 to execute the BCM. This is accomplished through a series of tables that point to one another in various ways. The pointers are typically comprised of next function and next index designations. The next function points to the next table, and the next index points to an entry or a range of entries in that table. The data structure has a trunk circuit table 802, a trunk group table 804, an exception table 806, an ANI table 808, a called number table 810, and a routing table 812.

The trunk circuit table 802 contains information related to the connections. Typically, the connections are DS0 or ATM connections. Initially, the trunk circuit table 802 is used to retrieve information about the originating connection. Later, the table is used to retrieve information about the terminating connection. When the originating connection is being processed, the trunk group number in the trunk circuit table 802 points to the applicable trunk group for the originating connection in the trunk group table 804.

The trunk group table 804 contains information related to the originating and terminating trunk groups. When the originating connection is being processed, the trunk group table 804 provides information relevant to the trunk group for the originating connection and typically points to the exception table 806.

The exception table 806 is used to identify various exception conditions related to the call that may influence the routing or other handling of the call. Typically, the exception table 806 points to the ANI table 808. Although, the exception table 806 may point directly to the trunk group table 804, the called number table 810, or the routing table 812.

The ANI table 808 is used to identify any special characteristics related to the caller's number. The caller's number is commonly known as automatic number identification (ANI). The ANI table 808 typically points to the called number table 810. Although, the ANI table 808 may point directly to the trunk group table 804 or the routing table 812.

The called number table 810 is used to identify routing requirements based on the called number. This will be the case for standard telephone calls. The called number table 810 typically points to the routing table 812. Although, it may point to the trunk group table 804.

The routing table 812 has information relating to the routing of the call for the various connections. The routing table 812 is entered from a pointer in either the exception table 806, the ANI table 808, or the called number table 810. The routing table 812 typically points to a trunk group in the trunk group table 804.

When the exception table 806, the ANI table 808, the called number table 810, or the routing table 812 point to the trunk group table 804, they effectively select the terminating trunk group. When the terminating connection is being processed, the trunk group number in the trunk group table 804 points to the trunk group that contains the applicable terminating connection in the trunk circuit table 804.

The terminating trunk circuit is used to extend the call. The trunk circuit is typically a VPI/VCI or a DS0. Thus it can be seen that by migrating through the tables, a terminating connection can be selected for a call.

Figure 9:
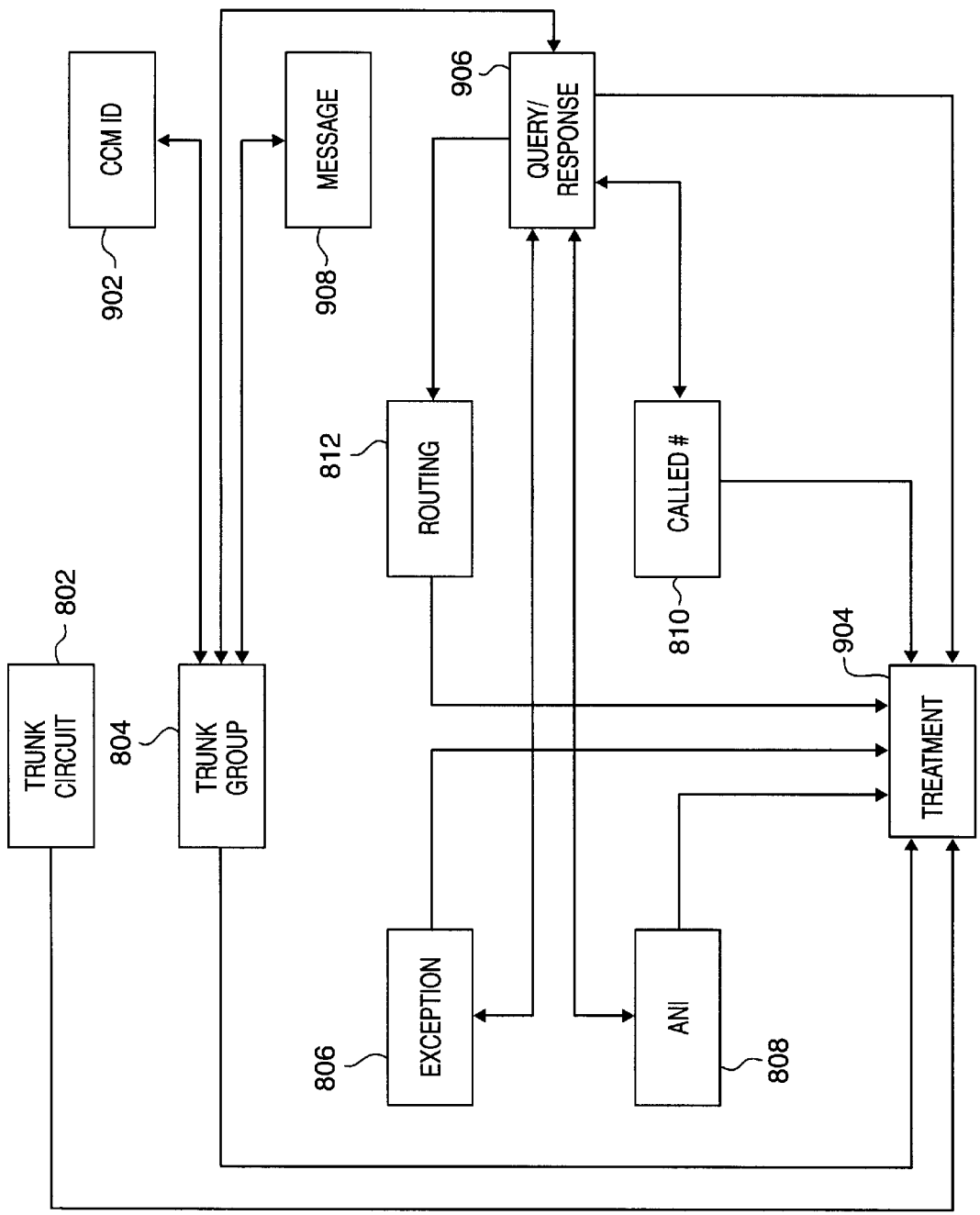
FIG. 9 is a block diagram of additional tables that are used in the signaling processor of FIG. 8.

FIG. 9 is an overlay of FIG. 8. The tables from FIG. 8 are present, but for clarity, their pointers have been omitted. FIG. 9 illustrates additional tables that can be accessed from the tables of FIG. 8. These include a CCM ID table 902, a treatment table 904, a query/response table 906, and a message table 908.

The CCM ID table 902 contains various CCM SS7 point codes. It can be accessed from the trunk group table 804, and it points back to the trunk group table 804.

The treatment table 904 identifies various special actions to be taken in the course of call processing. This will typically result in the transmission of a release message (REL) and a cause value. The treatment table 904 can be accessed from the trunk circuit table 802, the trunk group table 804, the exception table 806, the ANI table 808, the called number table 810, the routing table 812, and the query/response table 906.

The query/response table 906 has information used to invoke the SCF. It can be accessed by the trunk group table 804, the exception table 806, the ANI table 808, the called number table 810, and the routing table 812. It points to the trunk group table 804, the exception table 806, the ANI table 808, the called number table 810, the routing table 812, and the treatment table 904.

The message table 908 is used to provide instructions for messages from the termination side of the call. It can be accessed by the trunk group table 804 and points to the trunk group table 804.

FIGS. 10–17 depict examples of the various tables described above. FIG. 10 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppressor indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 11 depicts an example of the trunk group table. During origination processing, the trunk group number from the trunk circuit table is used to key into the trunk table.

Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 12 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 13 depicts an example of the ANI table. The index is used to enter the fields of the table. The calling party category differentiates among types of calling parties, for example, test calls, emergency calls, and ordinary calls. The calling partycharge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, nonunique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800/888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 14 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 12. The next function and next index point to the next table which is typically the routing table.

FIG. 15 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/ index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a tnnnk circuit in the trunk circuit table. The yield from the trunk circuit table is the terminating connection for the call.

It can be seen from FIGS. 10–15 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 16 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 17 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

What is claimed is:

1. A system for providing an interface for a call between an asynchronous transfer mode network and a local network, the call having user communications and call signaling, the system comprising:
   a first communication device adapted to communicate the call in an asynchronous transfer mode format;
   a second communication device adapted to communicate the call in a time division multiplex format;
   an application adapted to process the call; and
   an interface system comprising:
      a signaling processor adapted to receive the call signaling from the first communication device, to process the call signaling to select a first connection to the application, and to transport a first control message designating the selected first connection; and
      an interworking unit adapted to receive the user communications from the first communication device, to receive the first control message from the signaling processor, to interwork the user communications between the asynchronous transfer mode format and a format usable by the application, and to transport the user communications over the selected first connection designated in the first control message;
   wherein the application processes the call and is further adapted to transport a second control message notifying the signaling processor that processing is complete;
   wherein the signaling processor further is adapted to receive the second control message, to process the second control message to select a second connection from the interworking unit to the second communication device, and to transport a third control message designating the selected second connection; and
   wherein the interworking unit further is adapted to receive the processed user communications and the third control message and to interwork the user communications to the selected second connection to the second communication device.

2. The system of claim 1 wherein the application comprises a GR-303 converter adapted to convert call signaling between a signaling system #7 format and a GR-303 format.

3. The system of claim 1 wherein the application comprises an integrated services digital network converter adapted to convert call signaling between a signaling system #7 format and an integrated services digital network format.

4. The system of claim 1 wherein the application comprises an integrated services digital network converter adapted to convert call signaling between a GR-303 form at and an integrated services digital network format.

5. The system of claim 1 wherein the application comprises an optical interface adapted to convert the call between an optical format and an electrical format.

6. The system of claim 1 wherein the application comprises an electrical interface adapted to convert the call between an electrical format and an optical format.

7. The system of claim 1 wherein the application comprises a service platform adapted to process the user communications with an interactive application.

8. The system of claim 1 wherein the application comprises a tandem interface adapted to accept the call and to switch the call to a destination determined by the call signaling.

9. The system of claim 1 wherein the interface system is adapted to interwork call signaling between a signaling system #7 format and a GR-303 format.

10. The system of claim 1 wherein the interface system is adapted to interwork call signaling between a signaling system #7 format and an integrated services digital network format.

11. The system of claim wherein the interface system is adapted to interwork call signaling between a GR-303 format and an integrated services digital network format.

12. The system of claim 1 wherein the interface system comprises an optical interface adapted to convert the call between an optical format and an electrical format.

13. The system of claim 1 wherein the interface system comprises an electrical interface adapted to convert the call between an electrical format and an optical format.

14. The system of claim 1 wherein the interface system is adapted to interwork user communications between a GR-303 format and the asynchronous transfer mode format.

15. The system of claim 1 wherein the interface system is adapted to interwork user communications between an integrated services digital network format and the asynchronous transfer mode format.

16. The system of claim 1 wherein the interface system is adapted to interwork user communications between a GR-303 format and an integrated services digital network format.

17. A system for interworking a call between a plurality of networks, the call having call signaling and user communications, the system comprising:
   a GR-303 system adapted to handle the call;
   an integrated services digital network system adapted to handle the call;
   an asynchronous transfer mode system adapted to handle the call;
   a service platform having an application adapted to process the call;
   a signaling processor adapted to process the call signaling to select at least one of a connection for the call to the GR-303 system, the integrated services digital network system, the asynchronous transfer mode system, and the service platform, and to provide a control message that identifies the selected connection;
   a converter adapted to receive the call signaling from at least one of the GR-303 system and the integrated services digital network system, to interwork the call signaling in at least one of a GR-303 format, an integrated services digital network format, and a signaling system #7 format, and to exchange call signaling with the signaling processor in a format usable by the signaling processor; and an interworking unit adapted to receive the user communications, to exchange the call signaling between at least one of the GR-303 system and the integrated services digital network system and the converter, to receive the control message from the signaling processor, and to interwork the user communications over the selected connection identified in the control message;

wherein the signaling processor is adapted to receive call signaling from the asynchronous transfer mode system and the service platform.

18. The system of claim 17 further comprising a cross connect adapted to receive the user communications from the interworking unit and to route the user communications on the selected connection.

19. The system of claim 17 wherein the selected connection comprises a selected virtual path identifier/virtual channel identifier.

20. The system of claim 17 wherein the signaling processor is adapted to process the call signaling in a signaling system #7 format.

21. The system of claim 20 wherein the signaling processor is adapted to exchange the call signaling with the asynchronous transfer mode system in the signaling system #7 format.

22. The system of claim 17 wherein the service platform comprises a media processor adapted to receive the user communications and to process the user communications with the service application.

23. The system of claim 17 wherein the service platform comprises a host computer adapted to control the processing of the user communications in the service platform with the service application.

24. The system of claim 17 further comprising a service database adapted to store service data wherein the host computer is adapted to retrieve the service data from the service database to assist in call processing.

25. The system of claim 17 further comprising a service database having processing option information denoting services available for the call wherein the host computer is adapted to retrieve the processing option information from the service database to assist in call processing.

26. The system of claim 17 further comprising a service database having service data available to the call wherein the signaling processor is adapted to retrieve the service data from the service database to assist in call processing.

27. The system of claim 17 further comprising a service database having processing option information denoting services available for the call wherein the signaling processor is adapted to retrieve the processing option information from the service database to assist in call processing.

28. A system for interworking a call between a plurality of networks, the call having call signaling and user communications, the system comprising:

a GR-303 system adapted to handle the call;

an integrated services digital network system adapted to handle the call;

an asynchronous transfer mode system adapted to handle the call;

a signaling processor adapted to receive the call signaling, to process the call signaling to select at least one of a connection for the call to the GR-303 system, the integrated services digital network system, and the asynchronous transfer mode system, and to provide a control message that identifies the selected connection; and an interworking unit adapted to receive the user communications, to receive the control message from the signaling processor, and to interwork the user communications over the selected connection identified in the control message.

29. The system of claim 28 further comprising a cross connect adapted to receive the user communications from the interworking unit and to route the user communications on the selected connection.

30. The system of claim 28 wherein the selected connection comprises a selected virtual path identifier/virtual channel identifier.

31. The system of claim 28 further comprising a converter adapted to exchange the call signaling between the GR-303 system in a GR-303 format and the signaling processor in a format processable by the signaling processor.

32. The system of claim 31 wherein the converter is adapted to interwork the call signaling between the GR-303 format and a signaling system #7 format.

33. The system of claim 28 wherein the interworking unit is adapted to exchange the call signaling between at least one of the GR-303 system and the integrated services digital network system and the converter.

34. The system of claim 28 further comprising a converter adapted to exchange the call signaling between the integrated services digital network system in an integrated services digital network format and the signaling processor in a format processable by the signaling processor.

35. The system of claim 34 wherein the converter is adapted to interwork the call signaling between the integrated services digital network format and a signaling system #7 format.

36. The system of claim 28 wherein the signaling processor is adapted to process the call signaling in a signaling system #7 format.

37. The system of claim 36 wherein the signaling processor is adapted to exchange the call signaling with the asynchronous transfer mode system in the signaling system #7 format.

38. The system of claim 28 further comprises a service platform adapted to receive the user communications and to process the user communications with a service application.

39. The system of claim 38 wherein the service platform comprises a media processor adapted to receive the user communications and to process the user communications with the service application.

40. The system of claim 38 wherein the service platform comprises a host computer adapted to control the processing of the user communications in the service platform with the service application.

41. The system of claim 38 further comprising a service database adapted to store service data wherein the host computer is adapted to retrieve the service data from the service database to assist in call processing.

42. The system of claim 38 further comprising a service database having processing option information denoting services available for the call wherein the host computer is adapted to retrieve the processing option information from the service database to assist in call processing.

43. The system of claim 28 further comprising a service database having service data available to the call wherein the signaling processor is adapted to retrieve the service data from the service database to assist in call processing.

44. The system of claim 28 further comprising a service database having processing option information denoting services available for the call wherein the signaling processor is adapted to retrieve the processing option information from the service database to assist in call processing.

45. A system for providing a tandem connection for a call, the call having call signaling and user communications, the system comprising:
- a first communication device adapted to transport the call as traffic in a GR-303 format;
- a second communication device adapted to receive the call;
- a first interworking unit adapted to receive the traffic for the call from the first communication device over a first connection, to convert the traffic from the GR-303 format to asynchronous transfer mode cells that identify a selected second connection identified in a first control message, and to transport the asynchronous transfer mode cells;
- a cross connect adapted to receive the asynchronous transfer mode cells from the first interworking unit and to route the asynchronous transfer mode cells based on the selected second connection identified in the asynchronous transfer mode cells;
- a second interworking unit adapted to receive the asynchronous transfer mode cells from the cross connect over the selected virtual connection, to convert the asynchronous transfer mode cells into a into traffic having a format receivable by the second communication device, and to transport the traffic over a selected third connection to the second communication device identified in a second control message;
- a third communication device adapted to receive the asynchronous transfer mode cells from the cross connect over the selected second connection; and
- a signaling processor linked to the first communication device, the second communication device, the third communication device, first interworking unit, and the second interworking unit wherein:
  - the signaling processor is adapted to receive and process the call signaling from the first communication device to select the second connection and, if the selected second connection connects cross connect and the second interworking unit, to select the third connection, to provide the first control message for the call to the first interworking unit, and to provide the second control message for the call to one of the second interworking unit and the third communication device, and
  - the first control message identifies the first connection and the selected second connection,
  - the second control message identifies the selected second connection and the third connection, and
  - the first connection, the selected second connection, and the selected third connection form a tandem connection.

46. The system of claim 45 wherein the third communication device comprises a gateway.

47. The system of claim 45 wherein the third communication device comprises a asynchronous transfer mode communication device.

48. The system of claim 45 wherein the second communication device is adapted to receive the call in the GR-303 format.

49. The system of claim 45 wherein the second communication device is adapted to receive the call in an integrated services digital network format.

50. The system of claim 45 wherein the second communication device comprises a synchronous optical network device.

51. The system of claim 45 wherein the second communication device comprises a synchronous digital hierarchy device.

52. A system for providing a tandem connection for a call, the call having call signaling and user communications, the system comprising:
- a first communication device adapted to transport the call as traffic in a integrated services digital network format;
- a second communication device adapted to receive the call;
- a first interworking unit adapted to receive the traffic for the call from the first communication device over a first connection, to convert the traffic from the integrated services digital network format to asynchronous transfer mode cells that identify a selected second connection identified in a first control message, and to transport the asynchronous transfer mode cells;
- a cross connect adapted to receive the asynchronous transfer mode cells from the first interworking unit and to route the asynchronous transfer mode cells based on the selected second connection identified in the asynchronous transfer mode cells;
- a second interworking unit adapted to receive the asynchronous transfer mode cells from the cross connect over the selected virtual connection, to convert the asynchronous transfer mode cells into a into traffic having a format receivable by the second communication device, and to transport the traffic over a selected third connection to the second communication device identified in a second control message;
- a third communication device adapted to receive the asynchronous transfer mode cells from the cross connect over the selected second connection; and
- a signaling processor linked to the first communication device, the second communication device, the third communication device, first interworking unit, and the second interworking unit wherein:
  - the signaling processor is adapted to receive and process the call signaling from the first communication device to select the second connection and, if the selected second connection connects cross connect and the second interworking unit, to select the third connection, to provide the first control message for the call to the first interworking unit, and to provide the second control message for the call to one of the second interworking unit and the third communication device, and
  - the first control message identifies the first connection and the selected second connection,
  - the second control message identifies the selected second connection and the third connection, and
  - the first connection, the selected second connection, and the selected third connection form a tandem connection.

53. The system of claim 52 wherein the third communication device comprises a gateway.

54. The system of claim 52 wherein the third communication device comprises a asynchronous transfer mode communication device.

55. The system of claim 52 wherein the second communication device is adapted to receive the call in the GR-303 format.

56. The system of claim 52 wherein the second communication device is adapted to receive the call in an integrated services digital network format.

57. The system of claim 52 wherein the second communication device comprises a synchronous optical network device.

58. The system of claim 52 wherein the second communication device comprises a synchronous digital hierarchy device.

59. A method for handling a call, the method comprising:

receiving signaling in a first signaling format into an interface unit;

transferring the signaling in the first signaling format from the interface unit to a signaling converter;

in the signaling converter, converting the signaling from the first signaling format to a second signaling format;

transferring the signaling in the second signaling format from the signaling converter to a signaling processor;

in the signaling processor, processing the signaling to generate a first control message identifying the first connection;

transferring the first control message from the signaling processor to the interface unit;

receiving user communications in a first communications format into the interface unit;

transferring the user communications over the first connection from the interface unit to a service platform in response to the first control message;

in the service platform, providing a service and generating a second control message in response to the user communications;

transferring the second control instruction from the service platform to the signaling processor;

in the signaling processor, processing the second control message to generate a third control message identifying a second connection; and transferring the third control message from the signaling processor to the interface unit; and transferring the user communications in a second communications format from the interface unit over the second connection in response to the third control message.

60. The method of claim 59 wherein the first signaling format and the first communications format comprise a GR-303 format.

61. The method of claim 59 wherein the first signaling format and the first communications format comprise an Integrated Services Digital Network format.

62. The method of claim 59 wherein the second signaling format comprises Signaling System #7.

63. The method of claim 59 wherein the second communications format comprises an asynchronous transfer mode format.

64. The method of claim 59 further comprising collecting digits from the user communications in the interface unit.

65. The method of claim 64 further comprising:

transferring the digits from the interface unit to the signaling converter;

converting the digits into the second signaling format;

transferring the digits in the second signaling format to the signaling processor; and processing the digits in the signaling processor.

66. The method of claim 59 further comprising:

processing the second control message in the signaling processor to generate new signaling in the second signaling format; and transmitting the new signaling from the signaling processor.

67. The method of claim 59 further comprising:

processing the signaling to generate a fourth control message identifying the service; and transferring the fourth control message from the signaling processor to the service platform.

68. The method of claim 67 wherein the service is a calling card service.

69. The method of claim 67 wherein the service is a call routing service.

70. The method of claim 67 wherein the service is a interactive voice service.

71. The method of claim 59 further comprising:

processing the signaling in the signaling processor to select echo cancellation for the call; and providing echo cancellation in the interface unit in response to the echo cancellation selection.

72. A call processing system comprising:

an interface unit configured to receive and transfer signaling for a call in a first signaling format, receive a first control message for the call identifying a first connection, receive user communications for the call in a first communications format, transfer the user communications over the first connection in response to the first control message, receive a third control message for the call identifying a second connection, and transfer the user communications in a second communications format over the second connection in response to the third control message;

a signaling converter configured to receive the signaling from interface unit in the first signaling format, convert the signaling from the first signaling format to a second signaling format, and transfer the signaling in the second signaling format;

a signaling processor configured to receive the signaling from the signaling converter in the second signaling format, process the signaling to generate and transfer the first control message identifying the first connection, receive and process a second control message to generate and transfer the third control message identifying the second connection; and a service platform configured to receive the user communications over the first connection, provide a service and transfer the second control instruction in response to the user communications.

73. The call processing system of claim 72 wherein the first signaling format and the first communications format comprise a GR-303 format.

74. The call processing system of claim 72 wherein the first signaling format and the first communications format comprise an Integrated Services Digital Network format.

75. The call processing system of claim 72 wherein the second signaling format comprises Signaling System #7.

76. The call processing system of claim 72 wherein the second communications format comprises an asynchronous transfer mode format.

77. The call processing system of claim 72 wherein the interface unit is further configured to collect digits from the user communications.

78. The call processing system of claim 72 wherein:

the interface unit is further configured to transfer the digits to the signaling converter;

the signaling converter is further configured to convert the digits into the second signaling format and transfer the digits in the second signaling format to the signaling processor; and the signaling processor is further configured to process the digits.

79. The call processing system of claim 72 wherein the signaling processor is further configured to process the second control message to generate new signaling in the second signaling format and transmit the new signaling.

80. The call processing system of claim 72 wherein the signaling processor is further configured to process the signaling to generate a fourth control message identifying the service and transfer the fourth control message to the service platform.

81. The call processing system of claim 80 wherein the service is a calling card service.

82. The call processing system of claim 80 wherein the service is a call routing service.

83. The call processing system of claim 80 wherein the service is a interactive voice service.

84. The call processing system of claim 72 further comprising:
   the signaling processor is further configured to processing the signaling to select echo cancellation for the call; and
   the interface unit is further configured to provide echo cancellation in response to the echo cancellation selection.

\* \* \* \* \*